(12) United States Patent
Suzuki et al.

(10) Patent No.: US 12,267,572 B1
(45) Date of Patent: Apr. 1, 2025

(54) OPTICAL ELEMENT DRIVING DEVICE

(71) Applicants: Shun Suzuki, Tokyo (JP); Tomohiko Osaka, Tokyo (JP)

(72) Inventors: Shun Suzuki, Tokyo (JP); Tomohiko Osaka, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 18/956,245

(22) Filed: Nov. 22, 2024

Related U.S. Application Data

(63) Continuation of application No. 17/995,993, filed as application No. PCT/JP2021/012427 on Mar. 24, 2021, now Pat. No. 12,184,962.

(60) Provisional application No. 63/011,322, filed on Apr. 17, 2020.

(51) Int. Cl.
| | |
|---|---|
| *H04N 23/55* | (2023.01) |
| *G02B 13/00* | (2006.01) |
| *G03B 5/00* | (2021.01) |
| *H04N 23/57* | (2023.01) |

(52) U.S. Cl.
CPC ............ *H04N 23/55* (2023.01); *G02B 13/009* (2013.01); *G03B 5/00* (2013.01); *H04N 23/57* (2023.01); *G02B 13/0065* (2013.01); *G03B 2205/0046* (2013.01)

(58) Field of Classification Search
None
See application file for complete search history.

(56) References Cited

U.S. PATENT DOCUMENTS

| | | |
|---|---|---|
| 2007/0164635 A1 | 7/2007 | Witteveen |
| 2007/0217775 A1* | 9/2007 | Shirono ................. H04N 23/55 348/E5.025 |
| 2008/0192363 A1* | 8/2008 | Shirono ............... G02B 13/009 348/E5.025 |
| 2009/0167878 A1 | 7/2009 | Kawazoe |
| 2011/0164331 A1 | 7/2011 | Sugiyama |

(Continued)

FOREIGN PATENT DOCUMENTS

| | | |
|---|---|---|
| JP | 2007-033574 A | 2/2007 |
| JP | 2008-503995 A | 2/2008 |
| JP | 4690398 B2 | 2/2011 |

(Continued)

OTHER PUBLICATIONS

International Search Report from International Application No. PCT/JP2021/012427 mailed Jun. 8, 2021.

*Primary Examiner* — Paul M Berardesca
(74) *Attorney, Agent, or Firm* — Shih IP Law Group, PLLC.

(57) ABSTRACT

This optical element driving device is provided with: a movable part capable of holding an optical element; a housing housed the movable part; a driving part that includes an ultrasonic motor and drives the movable part; a boosting part having an inductor that boosts input voltage inputted to the driving part and supplies the boosted input voltage to the ultrasonic motor; and a board part on which the inductor is disposed. The ultrasonic motor includes piezoelectric elements generating vibration by the input voltage and a resonant portion resonating with the vibration of the piezoelectric elements, the inductor is covered by a cover portion, and the housing is cut out at a location corresponding to the inductor.

5 Claims, 21 Drawing Sheets

(56) References Cited

U.S. PATENT DOCUMENTS

2020/0073082 A1 3/2020 Sakai
2020/0285019 A1 9/2020 Shiono

FOREIGN PATENT DOCUMENTS

| | | |
|---|---|---|
| JP | 2011-055665 A | 3/2011 |
| JP | 2011-252987 A | 12/2011 |
| JP | 2012-005957 A | 1/2012 |
| JP | 2014-017908 A | 1/2014 |
| JP | 2017-506366 A | 3/2017 |
| JP | 2018-036416 A | 3/2018 |
| JP | 2020-046515 A | 3/2020 |
| JP | 2020-048190 A | 3/2020 |
| JP | 2020-144279 A | 9/2020 |
| WO | 2011-099272 A1 | 8/2011 |
| WO | 2013141377 A1 | 9/2013 |
| WO | 2014013855 A1 | 1/2014 |

\* cited by examiner

1

OPTICAL ELEMENT DRIVING DEVICE

CROSS REFERENCE TO RELATED APPLICATION

This application is a Continuation of U.S. patent application Ser. No. 17/995,993 filed on Mar. 24, 2021, which is a National Phase of PCT Patent Application No. PCT/JP2021/012427 having International filing date of Aug. 9, 2019, which claims the benefit of priority of U.S. Provisional Patent Application No. 63/011,322 filed on Apr. 17, 2020. The contents of the above application are all incorporated by reference as if fully set forth herein in their entirety.

TECHNICAL FIELD

The present invention relates to an optical-element driving device.

BACKGROUND ART

Conventionally, a camera module mounted on a thin camera-mounted device such as a smartphone is known. Such a camera module is known to include a lens driving device (optical-element driving device) having a zoom function for enlarging or downsizing a subject image.

For example, PTL 1 discloses a configuration including a fixed lens on which light from a subject is incident, two movable lenses on which the light deflected by the fixed lens is incident, and a lens driving part for moving the two movable lenses in the direction of the optical axis.

CITATION LIST

Patent Literature

PTL 1

Japanese Patent Application Laid-Open No. 2018-36416

SUMMARY OF INVENTION

Technical Problem

In the meantime, using an ultrasonic motor including a piezoelectric element as a driving source of a movable lens has been considered from a viewpoint of miniaturization of a lens driving device. In order to drive the ultrasonic motor, a comparatively high drive voltage is needed. Since an input voltage for a lens driving device is comparatively low in the case of a thin camera-mounted device, it is necessary to boost the input voltage using an inductor to supply it to the ultrasonic motor.

However, a space for disposing the inductor is required aside from a space for the lens driving device in the camera-mounted device. Additionally, inductors are quite different individually. Thus, a user will need to adjust the inductor separately in consideration of relationship with the lens driving device. That is, the lens driving device using an ultrasonic motor might be less user-friendly.

An object of the present invention is to provide an optical-element driving device capable of enhancing user-friendliness.

Solution to Problem

An optical-element driving device configured to be built in a camera-mounted device, the optical-element driving device comprising:

2 a movable part configured to hold an optical element;
a housing housed the movable part;
a driving part including an ultrasonic motor and configured to drive the movable part with respect to the housing;
a boosting part including an inductor that boosts an input voltage to be inputted to the driving part and supplies the input voltage to the ultrasonic motor; and
a board part fixed to the housing and on which the inductor is disposed, wherein
the ultrasonic motor includes piezoelectric elements generating vibration by the input voltage and a resonant portion resonating with the vibration of the piezoelectric elements,
the inductor is covered by a cover portion, and
the housing is cut out at a location corresponding to the inductor.

Advantageous Effects of Invention

According to the present invention, it is possible to improve user-friendliness.

DESCRIPTION OF EMBODIMENTS

Figure 1:
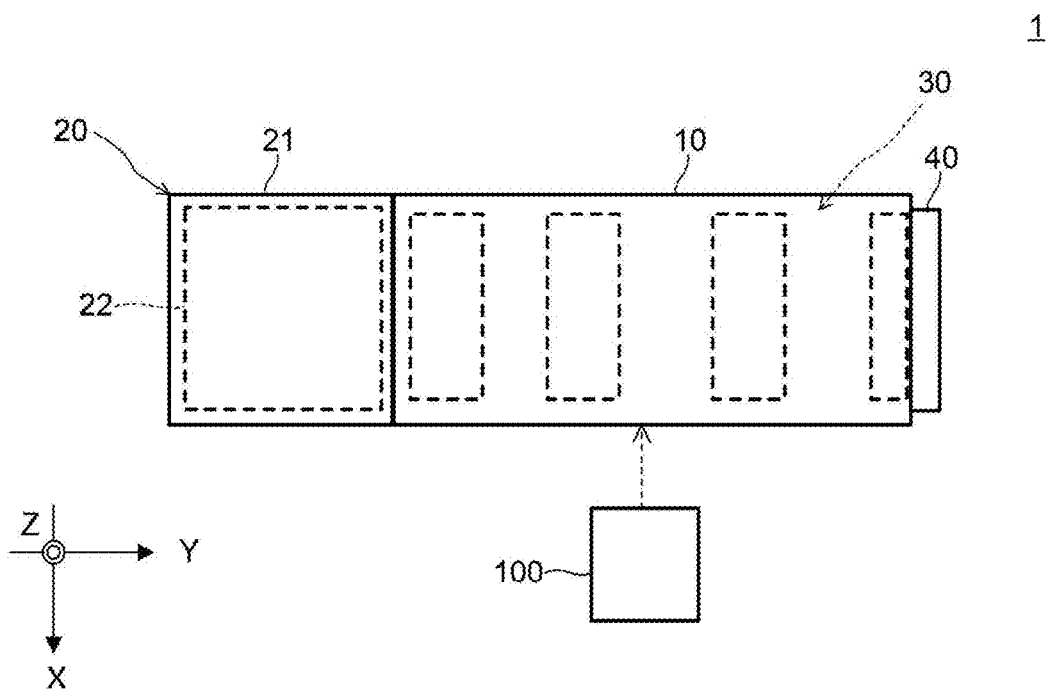
FIG. 1 is a diagram schematically illustrating a camera module according to an embodiment of the present invention.
Figure 2:
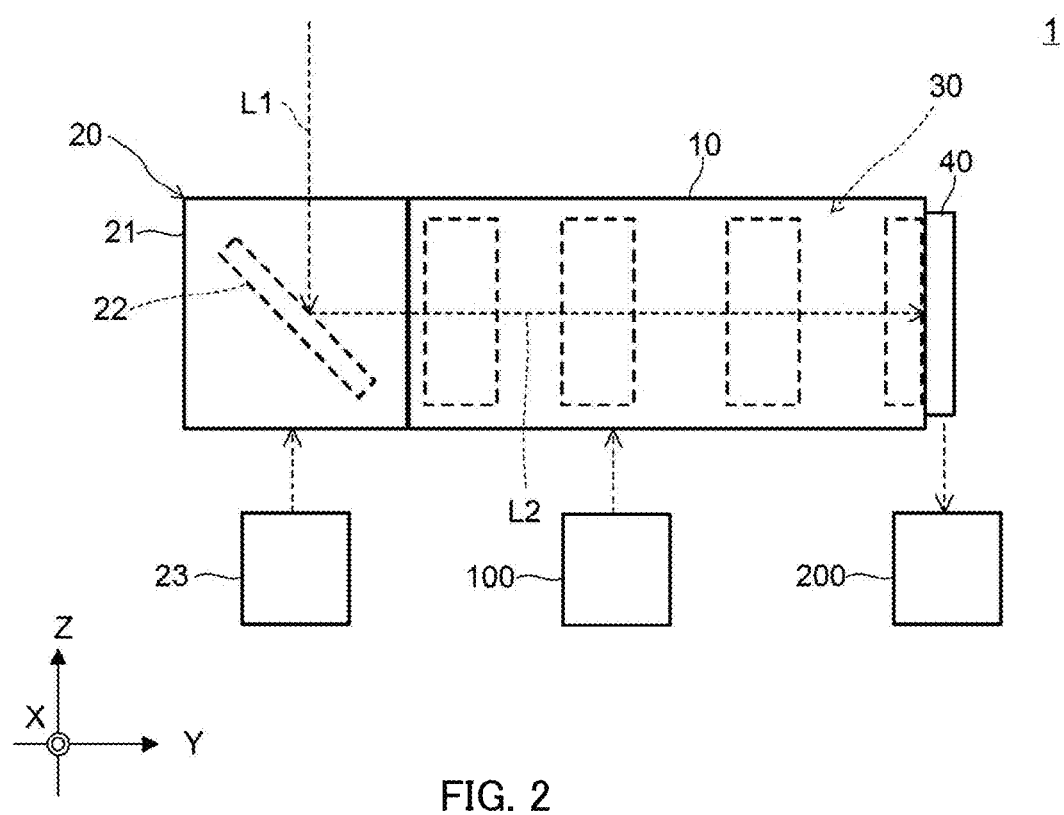
FIG. 2 schematically illustrates a configuration of the camera module as seen in a side view according to the present embodiment.

Hereinafter, embodiments of the present invention will be described in detail with reference to the drawings. FIG. 1 is a diagram schematically illustrating camera module 1 according to an embodiment of the present invention. FIG. 2 is a diagram schematically illustrating a configuration of camera module 1 according to the present embodiment as viewed from the side.

Figure 31A:
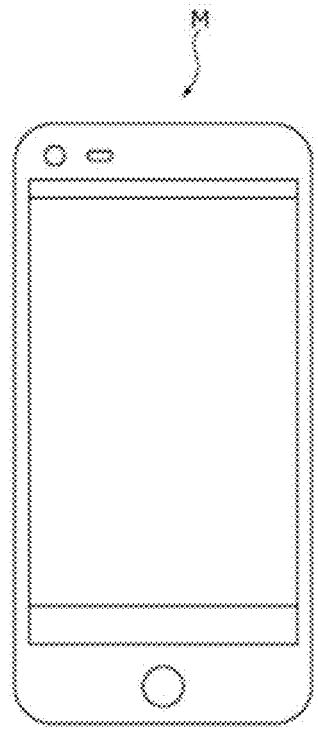
FIG. 31A is a diagram illustrating a smartphone in which the camera module is mounted.
Figure 31B:
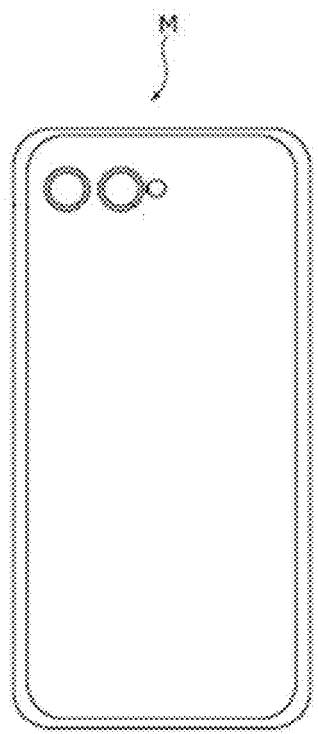
FIG. 31B is a diagram illustrating the smartphone in which the camera module is mounted.

Camera module 1 is mounted in thin camera-mounted devices such as, for example, smartphone M (see FIGS. 31A and 31B), a mobile phone, a digital camera, a notebook personal computer, a tablet terminal, a portable game machine, in-vehicle camera, and the like.

In explaining the structure of camera module 1 of the present embodiment, an orthogonal coordinate system (X, Y, Z) is used. The same orthogonal coordinate system (X, Y, Z) is also used for illustration of below-mentioned figures. Camera module 1 is mounted such that the horizontal direction is the X-direction, the vertical direction is the Y-direction, and the front-rear direction is the Z-direction, for example, during actually capturing an image with a camera-mounted device. Light from a subject is incident from the − side (minus side) in the Z direction, and is deflected and guided to the + side (plus side) in the Y direction. By reducing the thickness of camera module 1 in the Z direction, it is possible to reduce the thickness of the camera-mounted device.

Figure 7:
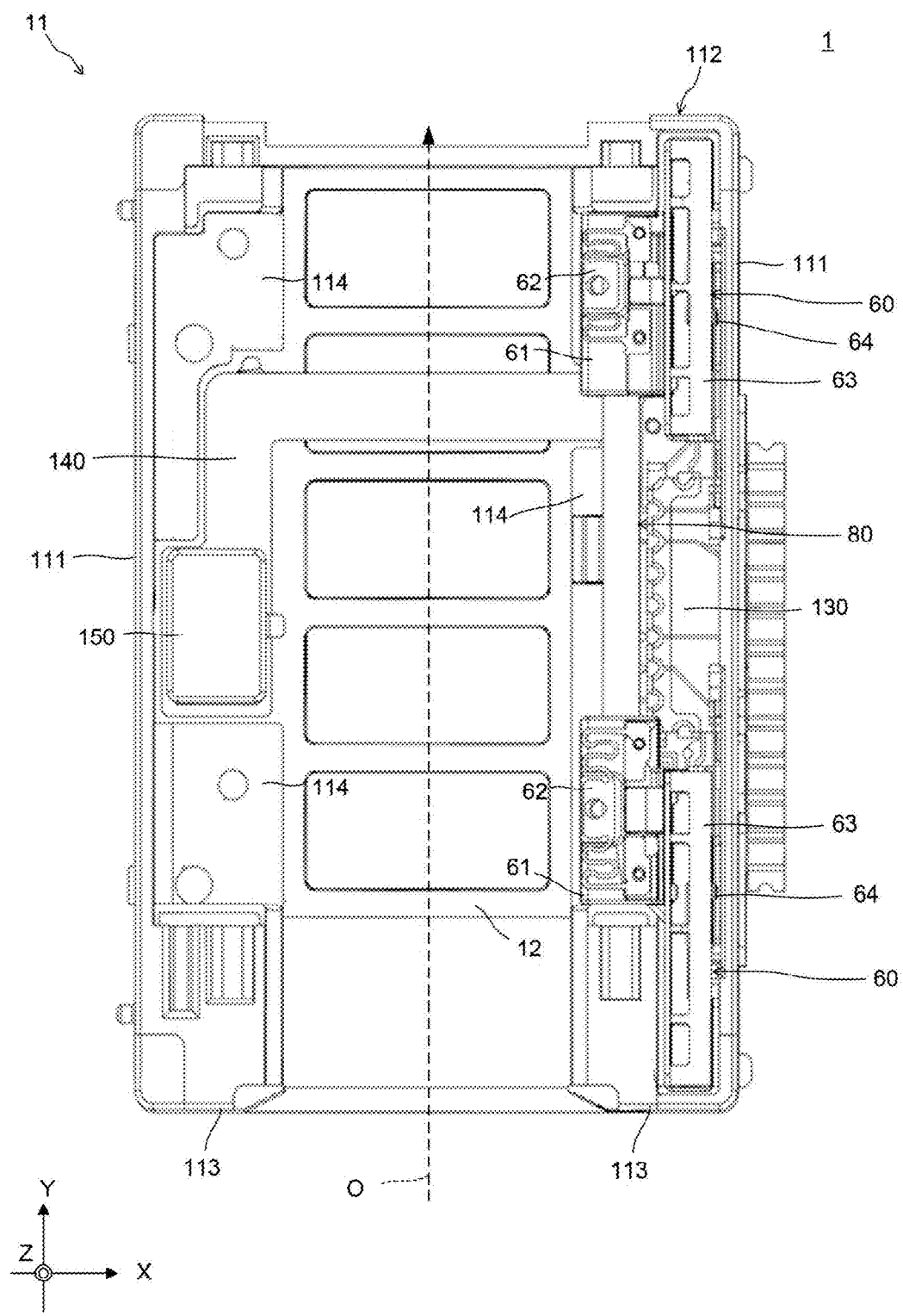
FIG. 7 illustrates the housing as seen from the + side in the Z direction.

As illustrated in FIG. 1, camera module 1 includes housing 10, reflection driving part 20, lens part 30, image capturing part 40, support shaft 50 (see FIG. 3), lens driving part 60 (see FIG. 5), position detecting part 70 (see FIG. 10), drive control part 100, terminal part 130, board part 140, and boosting part 150 (see FIG. 7).

Drive control part 100 includes a Central Processing Unit (CPU), Read Only Memory (ROM), Random Access Memory (RAM), or the like. The CPU reads a program suited to processing contents out of the ROM, develops the program in the RAM, and integrally controls an operation of each block of lens driving parts 60 in cooperation with the developed program. Thus, drive control part 100 drives, in the Y direction (the direction of the optical axis), second lens unit 32 and third lens unit 33 to be described later of lens part 30 housed in housing 10. As a result, camera module 1 performs stepless optical zoom and autofocus. Housing 10, support shaft 50, lens driving part 60, position detecting part 70, drive control part 100, terminal part 130, board part 140, and boosting part 150 correspond to the "optical-element driving device" of the present invention.

Further, as illustrated in FIG. 2, in camera module 1, incident light L1 is incident on housing 10 via reflection driving part 20. Reflection driving part 20 includes reflecting housing 21, mirror 22, and reflection drive control part 23. In the example illustrated in FIGS. 1 and 2, reflecting housing 21 is disposed adjacent to an end portion of housing 10 on the—side in the Y direction. Mirror 22 is disposed in reflecting housing 21, and reflects incident light L1 toward housing 10 as reflected light L2. Reflection drive control part 23 includes a CPU, a ROM, a RAM, and the like, and controls the orientation of mirror 22.

Mirror 22 according to the present embodiment has two rotation axes (not illustrated) extending in the X direction and the Y direction. In reflection driving part 20, mirror 22 is rotated about the rotation axes under the control of reflection drive control part 23. Thus, camera module 1 has a shake correction function (Optical Image Stabilization (OIS) function) for optically correcting a shake (vibration) that occurs during capturing an image, so as to reduce image irregularities.

Reflected light L2 incident on housing 10 is outputted to image capturing part 40 via lens part 30 accommodated in housing 10.

Image capturing part 40 is disposed on the outer surface of housing 10 on the + side in the Y-direction (placement portion 112B of second wall 112 to be described later), and is configured to allow reflected light L2 to be incident thereon through lens part 30. Image capturing part 40 includes an image capturing device, a board, and the like (not illustrated).

The image capturing device is composed of, for example, a Charge-Coupled Device (CCD) image sensor, a Complementary Metal Oxide Semiconductor (CMOS) image sensor, or the like. The image capturing device is mounted on the board and electrically connected to the interconnections on the board via bonding wires. The image capturing device captures a subject image imaged by lens part 30 and outputs an electrical signal corresponding to the subject image.

Further, a printed wiring board (not illustrated) is electrically connected to the board of image capturing part 40. The power supply to the image capturing device and the output of the electrical signal of the subject image imaged by the image capturing device are performed via the printed wiring board. The electrical signal is outputted to image capturing control part 200 disposed in the camera-mounted device. Image capturing control part 200 includes a CPU, a ROM, a RAM, and the like, and processes image information obtained by camera module 1. Image capturing control part 200 may be mounted on the camera-mounted device, or may also be built in camera module 1.

Figure 3:
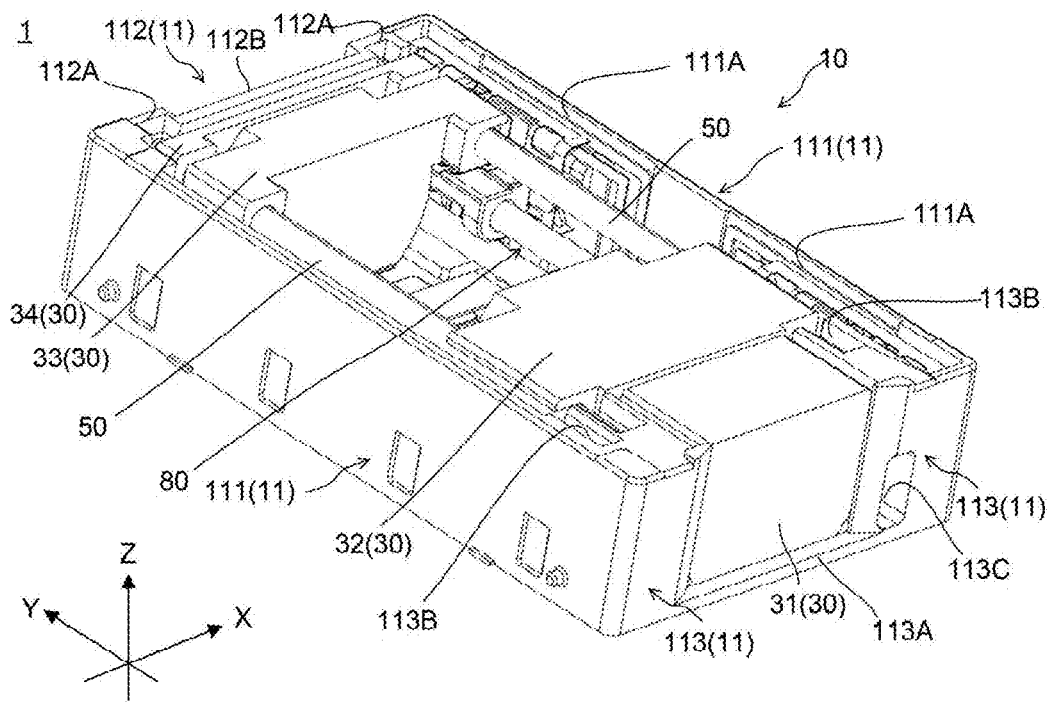
FIG. 3 is a perspective view illustrating a housing portion of the camera module.

As illustrated in FIG. 3, housing 10 houses lens part 30, support shafts 50, and lens driving parts 60 (see also FIG. 5), and for example, has a rectangular parallelepiped shape as a whole. Housing 10 has side wall portion 11 and bottom wall portion 12 (see FIG. 4).

Side wall portion 11 is a wall portion made of, for example, resin and having a portion opening on the − side in the Y direction, and has first walls 111, second wall 112, third wall 113, and fourth wall 114 (see also FIG. 7 and the like).

A pair of first walls 111 are configured to extend in the Y direction, and are disposed on both sides in the X direction. Of the pair of first walls 111, the inner surface of first wall 111 of housing 10 on the + side in the X-direction, placement portions 111A on which an ultrasonic motor to be described later is disposed are provided. On one of first walls 111 situated on the + side in the X direction, placement portions 111A are disposed on both sides of the central portion in the Y direction. First wall 111 situated on the + side in the X-direction corresponds to the "side wall" of the present invention.

Figure 4:
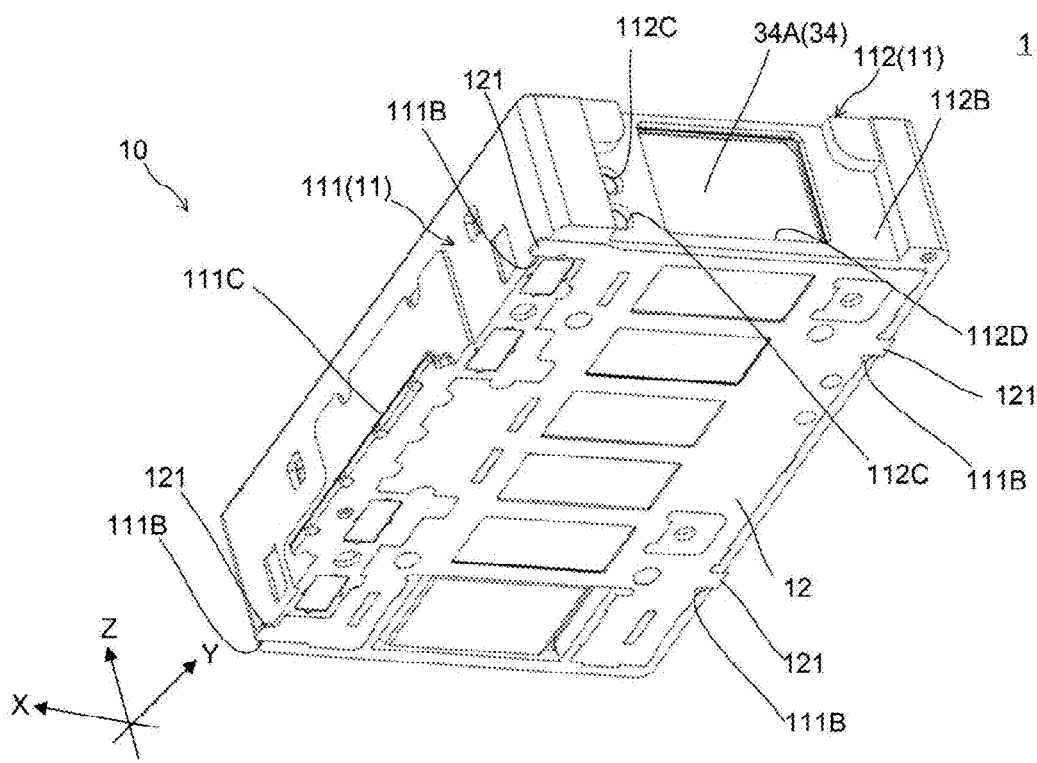
FIG. 4 is a perspective view of a bottom wall portion side of the housing portion of the camera module.

Further, as illustrated in FIG. 4, terminal placement portion 111C is disposed on first wall 111 on the + side in the X direction. Terminal part 130 is disposed on terminal placement portion 111C across the inside and outside of housing 10 via a gap formed between first wall 111 and bottom wall portion 12, for example (see FIG. 7 etc.). A portion of terminal part 130 disposed outside housing 10 is connected to predetermined interconnections of the camera-mounted device.

Further, engaged portions 111B with which positioning portions 121 of bottom wall portion 12 are engaged are formed in the bottom surface of first wall 111 (the surface on the − side in the Z direction).

As illustrated in FIGS. 3 and 4, second wall 112 is configured to extend in the X direction, and is disposed to connect together the end portions of the pair of first walls 111 on the + side in the Y direction. Further, in portions of the top surface of second wall 112 (the surface on the + side in the Z direction), supporting parts 112A for supporting support shafts 50 are provided on both sides in the X direction, respectively. Placement portion 112B on which image capturing part 40 is disposed is disposed on the outer surface of second wall 112.

Further, guide supporting portions 112C and opening portion 112D are formed in placement portion 112B of second wall 112. In the present embodiment, guide supporting portions 112C are holes for supporting guide shafts 81 and 82 to be described later, and are formed on the + side of opening portion 112D in placement portion 112B in the X-direction. Two guide supporting portions 112C are formed side by side in the Z-direction. Opening portion 112D is an opening in which fourth lens unit 34 of lens part 30 is fitted, and is formed in placement portion 112B at the central portion in the X-direction.

Figure 5:
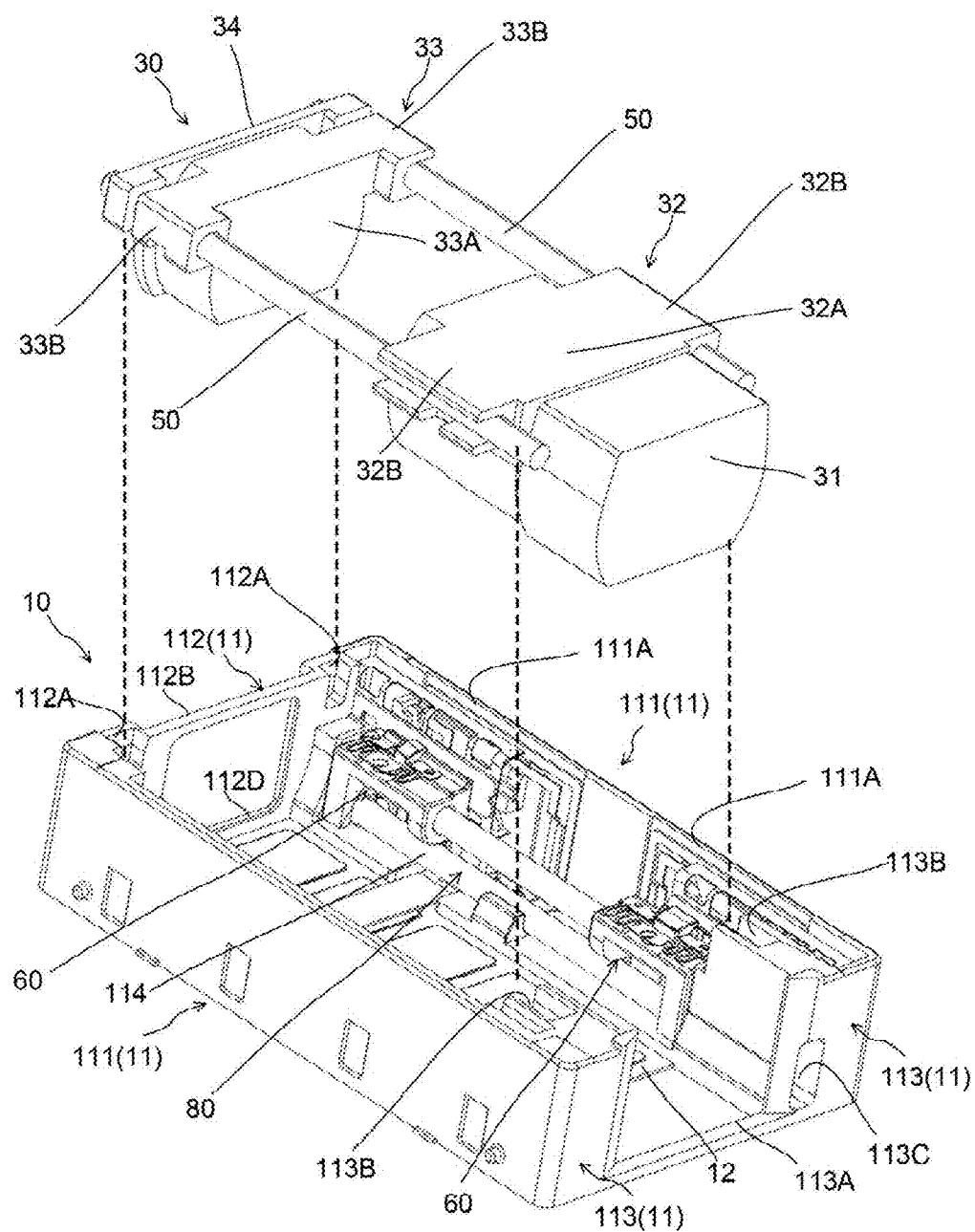
FIG. 5 is an exploded perspective view of a housing and a lens part.

As illustrated in FIGS. 3 and 5, third walls 113 are disposed respectively on the end portions of the pair of first walls 111 on the − side in the Y direction. The pair of third walls 113 are disposed to surround a space formed by first wall 111 and second wall 112. Between the pair of third walls 113, a gap large enough for first lens unit 31 of lens part 30 to enter there, and bridging portion 113A for bridging the end portions of respective third walls 113 on the − side in the Z-direction are disposed.

Further, supporting portions 113B for supporting support shafts 50 are formed in the top surfaces of the pair of third walls 113 (the surfaces on the + side in the Z direction). Guide supporting portion 113C for supporting guide shafts 81 and 82 to be described later is formed in one of third walls 113 which is situated on the + side in the X-direction, and near the central portion in the Z-direction.

Guide supporting portion 113C is a long hole configured to have a length in the Z direction corresponding to the placement range of two guide supporting portions 112C in second wall 112 described above. Guide supporting portion 113C is capable of supporting guide shafts 81 and 82 supported respectively by two guide supporting portions 112C in second wall 112.

As illustrated in FIG. 5, fourth walls 114 form bottom walls of the space formed by first walls 111, third walls 113 corresponding to first walls 111, and second wall 112, and are disposed in regions corresponding to third walls 113 in the X direction (see also FIG. 7). Therefore, a gap is formed between fourth walls 114 on both sides in the X direction. Fourth wall 114 corresponds to the "bottom wall" of the present invention.

Figure 6:
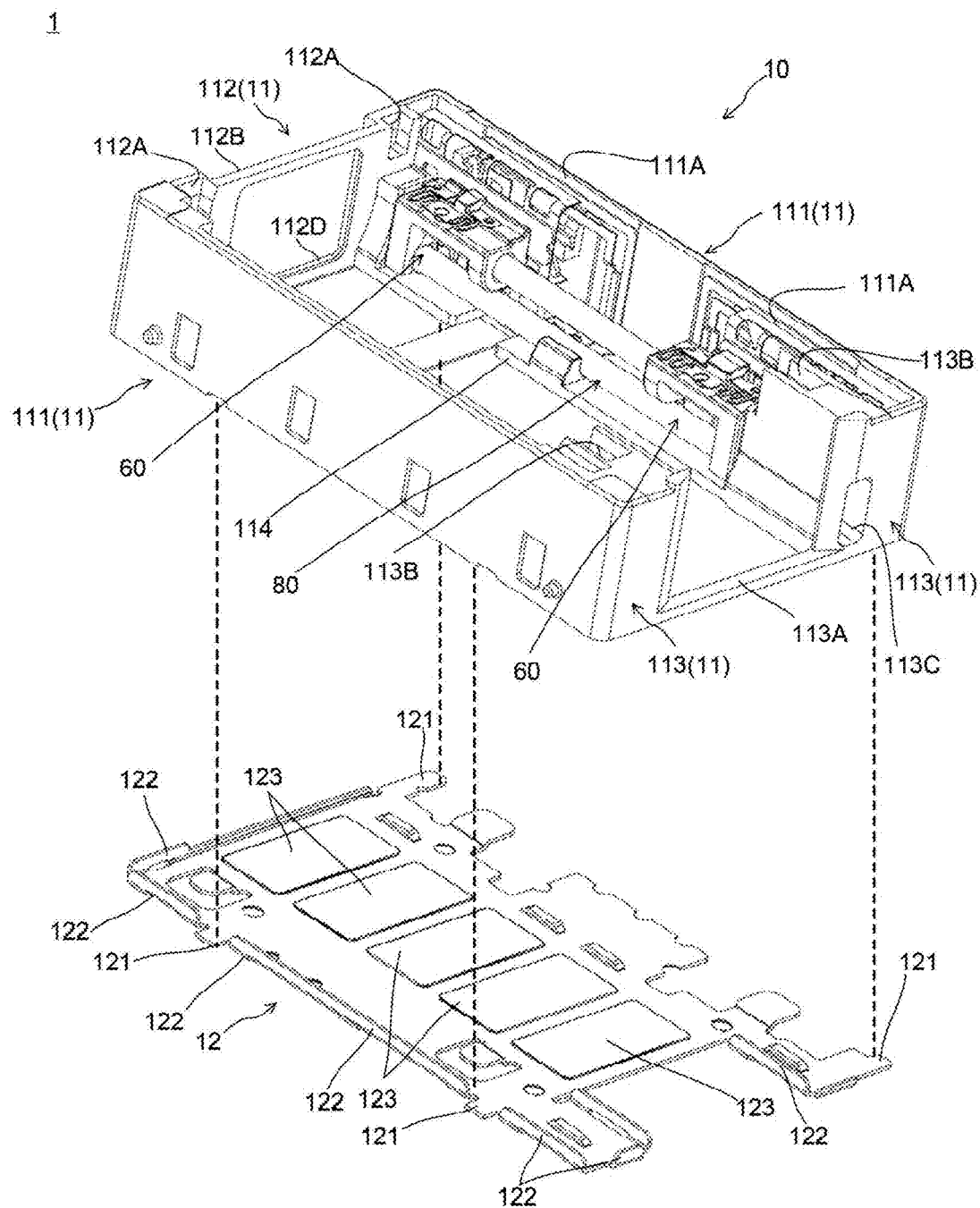
FIG. 6 is an exploded perspective view of a side wall portion and the bottom wall portion of the housing.
Figure 6:
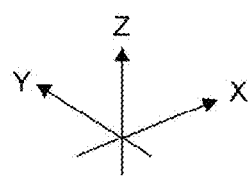

As illustrated in FIGS. 4 to 6, bottom wall portion 12 is, for example, a substantially rectangular metal plate forming a wall of housing 10 situated on the − side in the Z-direction, and is disposed like a bridge between fourth walls 114 and the pair of first walls 111 on opposite sides in the X direction. That is, bottom wall portion 12 is disposed on the sides of fourth walls 114 opposite to first walls 111 to cover fourth walls 114.

Bottom wall portion 12 is integrated by insert molding with the bottom portions of side wall portions 11 including the bottom portions of the pair of first walls 111. Further, in order that there is not any portion of bottom wall portion 12 at a portion corresponding to first lens unit 31, an end portion of bottom wall portion 12 on the − side in the Y direction is cut out.

Positioning portions 121 are formed on the both lateral ends of bottom wall portion 12 in the X direction. Positioning portions 121 are formed to protrude from the both lateral ends of bottom wall portion 12, and are to be engaged with engaged portions 111B of first wall 111 described above. Thus, it is possible to position bottom wall portion 12 in the Y direction.

Additionally, positioning portions 121 of bottom wall portion 12 are connected to a member (e.g., lid member (not illustrated) of housing 10) connected to the ground. Thus, bottom wall portion 12 is grounded.

Further, as illustrated in FIG. 6, bent portions 122 are disposed on the lateral ends of bottom wall portion 12 in the X direction and Y direction. Bent portions 122 are formed by bending the lateral ends on the + side in the Z direction.

Further, grooves (not illustrated) in which bent portions 122 are fitted are formed in portions of housing 10 corresponding to bent portions 122. Bent portions 122 are fitted in the grooves, and accordingly, bottom wall portion 12 is fixed to housing 10.

Further, a plurality of half punches 123 disposed in the Y direction are formed in the surface of bottom wall portion 12. Half punches 123 are formed in bottom wall portion 12 over the X direction. In the present embodiment, a total of five half punches 123 are formed.

Such formation of half punches 123 can improve the strength of the bottom wall portion of housing 10.

As illustrated in FIGS. 3 and 5, lens part 30 is disposed in a region that is interposed between the pair of first walls 111 and that includes a region where reflected light L2 from reflection driving part 20 (see FIG. 2) passes. Lens part 30 includes first lens unit 31, second lens unit 32, third lens unit 33, and fourth lens unit 34 that are disposed side by side in the Y direction. Lens part 30 corresponds to the "optical part" of the present invention.

First lens unit 31 is disposed on the most upstream side in the incidence direction of reflected light L2 (direction toward the + side in the Y direction), and is fixed between the pair of third walls 113 in housing 10.

The side surfaces of first lens unit 31 are configured to be curved so as to be convex at central portions in the Z direction, for example. The side surfaces of third wall 113 on the first lens unit 31 side are shaped, for example, to conform the side surfaces of first lens unit 31, and are configured such that the curved portions of first lens unit 31 are fitted thereto. Thus, first lens unit 31 is fixed between the pair of third walls 113.

Second lens unit 32 is disposed on the downstream side of first lens unit 31 in the incidence direction, and includes main body portion 32A and supported portions 32B. Third lens unit 33 is disposed on the downstream side of second lens unit 32 in the incidence direction, and includes main body portion 33A and supported portions 33B. Second lens unit 32 corresponds to the "first movable part" of the present invention, and third lens unit 33 corresponds to the "second movable part" of the present invention.

Main body portions 32A and 33A hold a lens through which the light having passed through first lens unit 31 passes. Supported portions 32B and 33B are portions movably supported by support shafts 50 and are disposed on both sides of main body portions 32A and 33A in the X-direction.

The lens included in main body portion 32A of second lens unit 32 corresponds to the "first optical element" of the present invention. The lens included in main body portion 33A of third lens unit 33 corresponds to the "second optical element" of the present invention.

Fourth lens unit 34 is disposed on the most downstream side in the incidence direction, and is configured to include a lens. Fourth lens unit 34 is supported by support shafts 50 at a position adjacent to second wall 112 of housing 10. As illustrated in FIG. 4, in the present embodiment, protruding portion 34A is formed on the surface of fourth lens unit 34 on the + side in the Y-direction.

The lenses in first to fourth lens units 31 to 34 may be assembled to housing 10 when the optical-element driving device is manufactured, or may be assembled to housing 10 when camera module 1 is manufactured from the optical-element driving device.

Protruding portion 34A has a size making it possible to be fitted into opening portion 112D in second wall 112. By this protruding portion 34A fitted into opening portion 112D, fourth lens unit 34 is fixed to housing 10.

As illustrated in FIGS. 3 and 5, support shafts 50 are formed of, for example, stainless steel or the like. Support shafts 50 extend in the Y direction, and are disposed respectively in regions of the pair of third walls 113. In the present embodiment, support shafts 50 are formed to have equal lengths, and are supported by supporting portions 113B of third walls 113 and supporting portions 112A of second wall 112.

Lens driving parts 60 are disposed to correspond respectively to second lens unit 32 and third lens unit 33, and each of the lens driving parts moves corresponding one of second lens unit 32 and third lens unit 33 independently under the control of drive control part 100 described above. Lens driving parts 60 are disposed in the region of one of fourth walls 114 on the + side in the X direction surrounded by first wall 111, second wall 112, and third wall 113. That is, as illustrated in FIG. 7, lens driving parts 60 are disposed in housing 10 on one end side of opposite ends of second lens unit 32 and third lens unit 33 with respect to optical axis O.

In the present embodiment, two lens driving parts 60 are disposed side by side in the Y direction. One of lens driving parts 60 on the − side in the Y direction drives second lens unit 32 in the Y direction, and the other one of lens driving parts 60 on the + side in the Y direction drives third lens unit 33 in the Y direction. That is, lens driving part 60 on the − side in the Y direction corresponds to the "first driving part" of the present invention, and lens driving part 60 on the + side in the Y direction corresponds to the "second driving part" of the present invention.

Each of lens driving parts 60 has substantially the same configuration in the present embodiment. Thus, in the following description, unless otherwise stated, only lens driving part 60 corresponding to second lens unit 32 will be described, and lens driving part 60 corresponding to third lens unit 33 will not be described. Further, lens driving parts 60 are symmetrically disposed in the Y direction in the present embodiment. Thus, the relationship between the + side and the − side in the Y direction in lens driving part 60 corresponding to third lens unit 33 is reverse with respect to the relationship between the + side and the − side in the Y direction in lens driving part 60 corresponding to second lens unit 32.

Lens driving part 60 includes frame 61, connecting part 62, interposition part 63, ultrasonic motor 64, and guide part 80.

Frame 61 is connected via connecting part 62 to one of supported portions 32B and 33B of second lens unit 32 and third lens unit 33.

Frame 61 is configured to be movable in the direction of optical axis O by guide part 80 guiding the movement in the direction of optical axis O (Y direction). Movement of frame 61 in the direction of optical axis O causes second lens unit 32 or third lens unit 33 connected to frame 61 via connecting part 62 to also move along support shafts 50.

Figure 8:
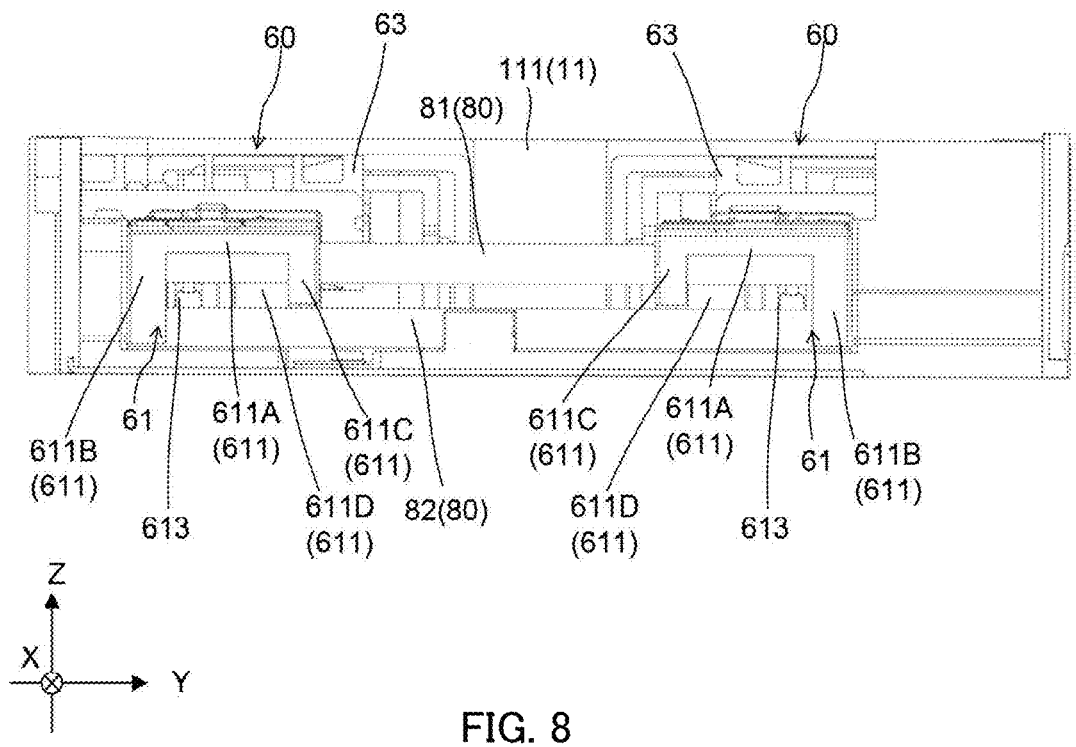
FIG. 8 illustrates the inside of the housing as seen from the − side in the X direction.
Figure 9:
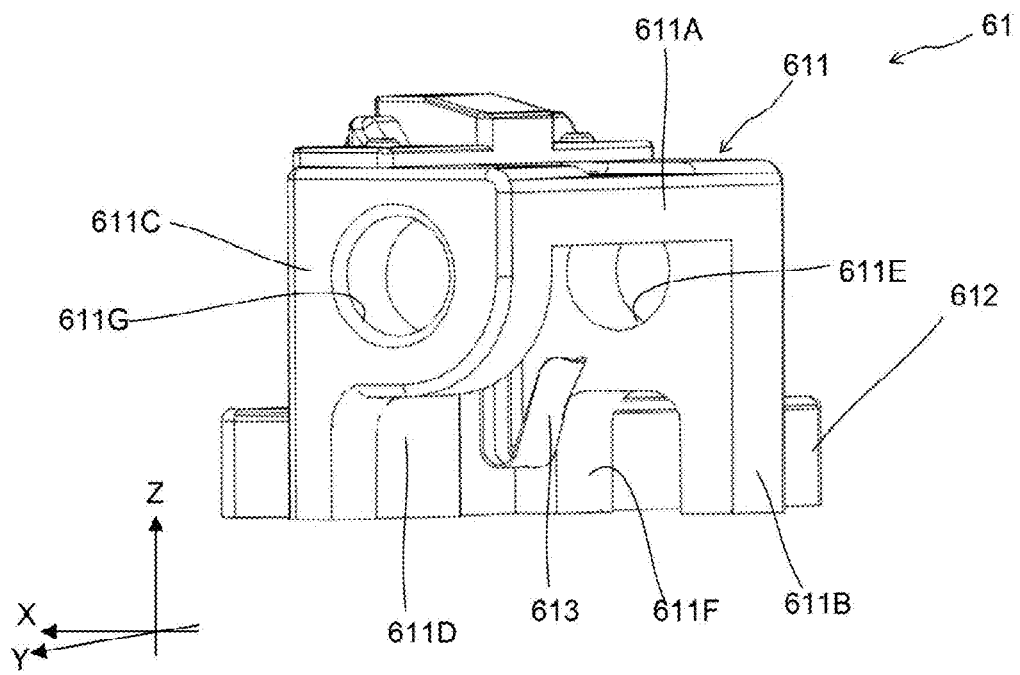
FIG. 9 is a diagram illustrating a guided portion.

As illustrated in FIGS. 8 and 9, frame 61 includes guided portion 611, and magnet holding portion 612. Guided portion 611 is a portion for guiding the movement of frame 61 by guide part 80 in the Y direction, and is disposed at a position corresponding to guide part 80 in the X direction. Guided portion 611 includes first portion 611A, second portion 611B, third portion 611C, and fourth portion 611D.

First portion 611A is a portion forming the top surface of frame 61 (surface on the + side in the Z direction), and is configured to extend in the direction of the optical axis (Y direction). First portion 611A is provided to cover guide part 80 from the + side in the Z-direction.

Figure 10:
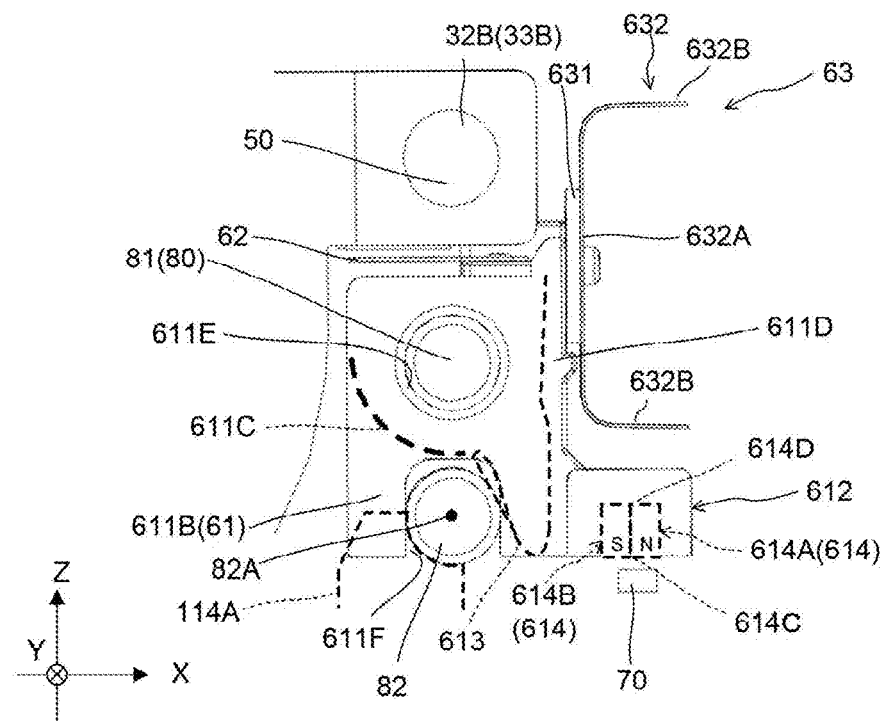
FIG. 10 is a diagram illustrating a connecting portion between the lens part and a frame.

Further, connecting part 62 (see FIG. 7) is disposed on the surface on the + side of first portion 611A in the Z-direction. As illustrated in FIG. 10, connecting part 62 is a plate-shaped spring member (elastic member) fixed to the surface of frame 61 on the + side in the Z-direction and to the surface of any of supported portions 32B and 33B of second lens unit 32 and third lens unit 33 on the − side in the Y-direction. By connecting part 62 composed of the spring member, the elastic force of the spring member can absorb the deviation of the positional relationship even when manufacturing tolerances or the like cause the deviation in the positional relationship between frame 61 and supported portions 32B and 33B.

As illustrated in FIGS. 8 to 10, second portion 611B extends to the − side in the Z direction (a predetermined direction) from the end portion of first portion 611A on the − side in the Y direction (one end of first portion 611A), and supports first guide shaft 81 and second guide shaft 82.

Shaft hole 611E extending through in the Y-direction is formed in second portion 611B. Shaft hole 611E is formed at a position corresponding to first guide shaft 81 to be described later, and allows first guide shaft 81 to pass therethrough.

Shaft engaging portion 611F is formed in the end portion of second portion 611B on the − side in the Z-direction. Shaft engaging portion 611F is formed at a position where engagement with below-described second guide shaft 82 is possible, and is engaged with second guide shaft 82 from the + side in the Z direction.

Third portion 611C is a portion that extends to the − side in the Z direction from the end portion of first portion 611A on the + side in the Y direction (the other end of first portion 611A), and supports second guide shaft 82. More particularly, third portion 611C extends to a position such that the end portion on the − side in the Z-direction is spaced apart from second guide shaft 82 by a predetermined distance.

Shaft hole 611G extending through in the Y-direction is formed in third portion 611C. Shaft hole 611G is formed at a position corresponding to first guide shaft 81, and allows first guide shaft 81 to pass therethrough.

Fourth portion 611D is a portion extending from the end portion of first portion 611A on the + side in the X-direction. Fourth portion 611D is formed over entire first portion 611A in the Y direction, and is disposed to cover guide part 80 from the + side in the X direction.

Absorbing part 613 is disposed between fourth portion 611D and guide part 80 (second guide shaft 82). Absorbing part 613 is composed of a spring member and is disposed between fourth portion 611D and second guide shaft 82. Absorbing part 613 biases second guide shaft 82 to the − side in the X direction with respect to fourth portion 611D. As a result, absorbing part 613 absorbs a deviation in the positional relationship between frame 61 and guide part 80.

Figure 11:
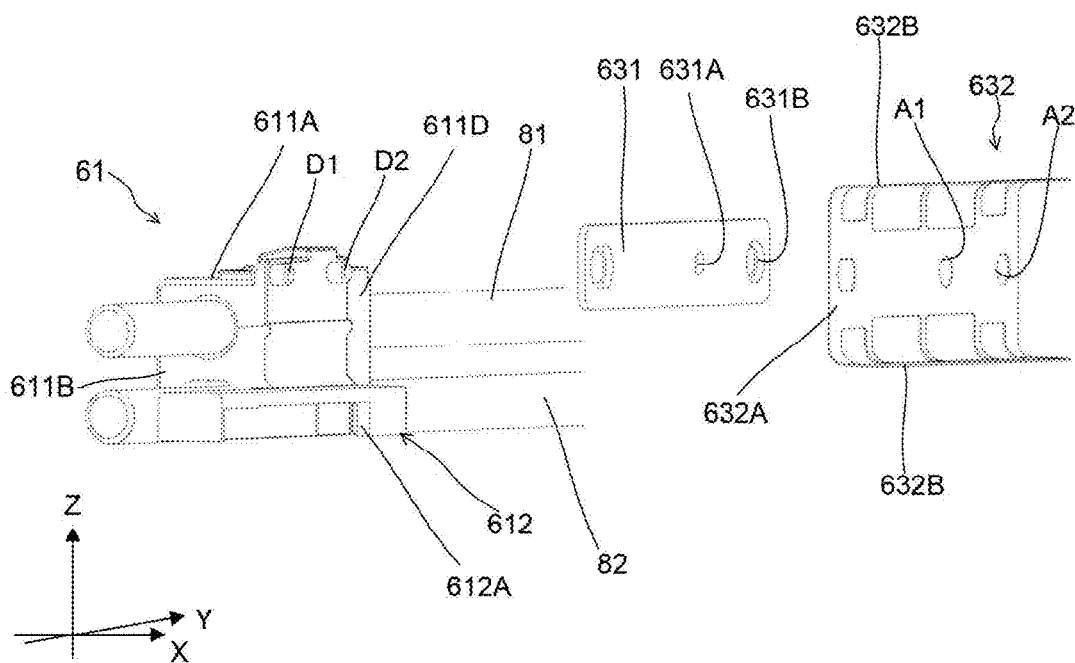
FIG. 11 is an exploded perspective view of the guided portion and an interposition part.

As illustrated in FIGS. 10 and 11, magnet holding portion 612 is a portion for holding magnet part 614 for position detection, and extends to the − side in the X direction from the end portion of fourth portion 611D on the − side in the Z direction.

Recessed portion 612A is formed in the end portion of magnet holding portion 612 on the − side in the Z-direction, and magnet part 614 is held in the recessed portion. Further, position detecting part 70 is disposed on a portion of housing 10 facing magnet part 614.

Position detecting part 70 is, for example, a Hall element for detecting the position of frame 61 in the Y direction, and detects the position of magnet part 614 based on a predetermined reference position. The predetermined reference position is a common position between two magnets 614A and 614B, for example, and is set to an appropriate position such as an end portion of bottom wall portion 12 on the + side or on the − side in the Y direction.

In magnet part 614, one magnet 614A is disposed such that the N pole faces position detecting part 70, and other magnet 614B is disposed such that the S pole faces position detecting part 70. That is, two magnets 614A and 614B are magnetized in a direction along a direction (Z direction in the present embodiment) in which magnet part 614 faces position detecting part 70, and such that the different poles face position detecting part 70.

Magnets 614A and 614B are disposed in contact with each other. Therefore, the different poles are arranged adjacently at opposing surface 614C of magnet part 614 facing position detecting part 70.

Figure 12A:
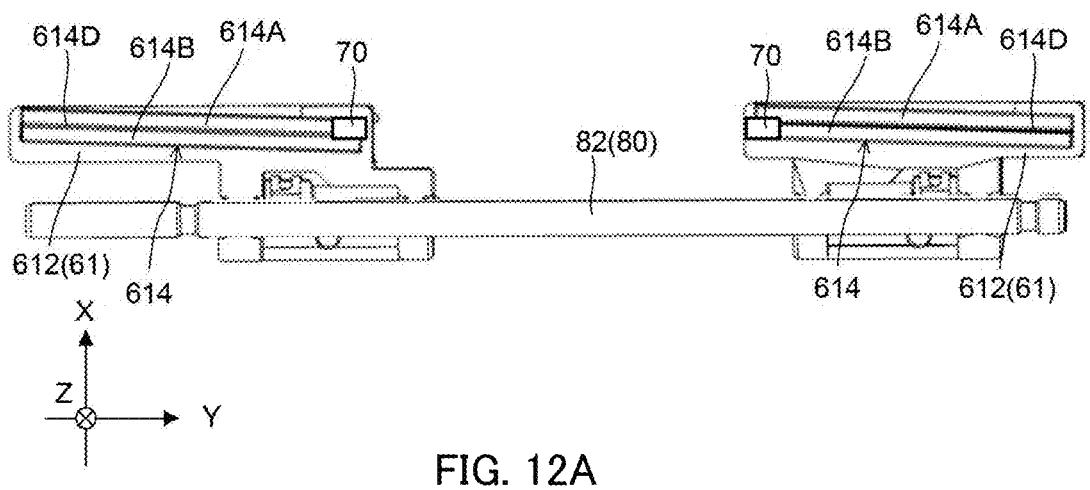
FIG. 12A is a diagram for explaining the positional relationship between the magnet and the position detecting part.
Figure 12B:
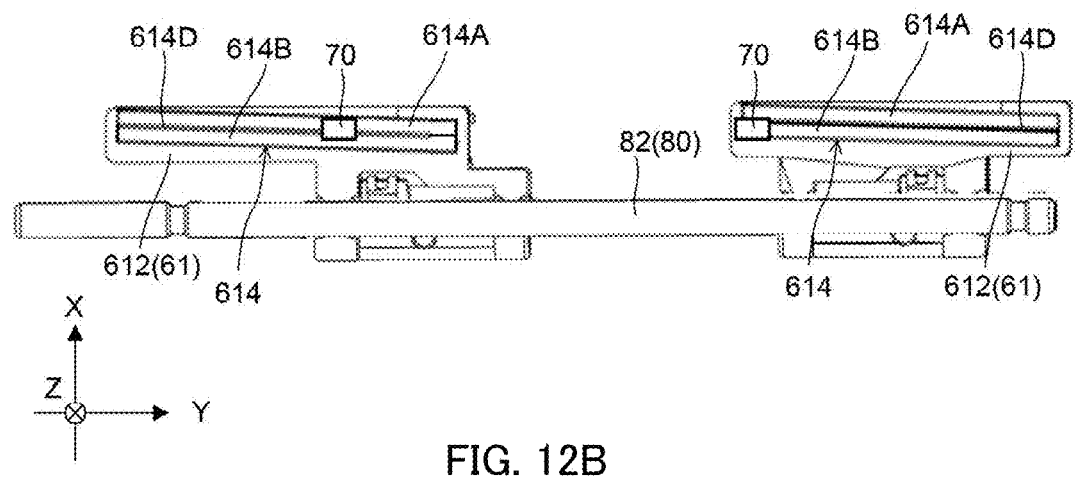
FIG. 12B is a diagram for explaining the positional relationship between the magnet and the position detecting part.
Figure 12C:
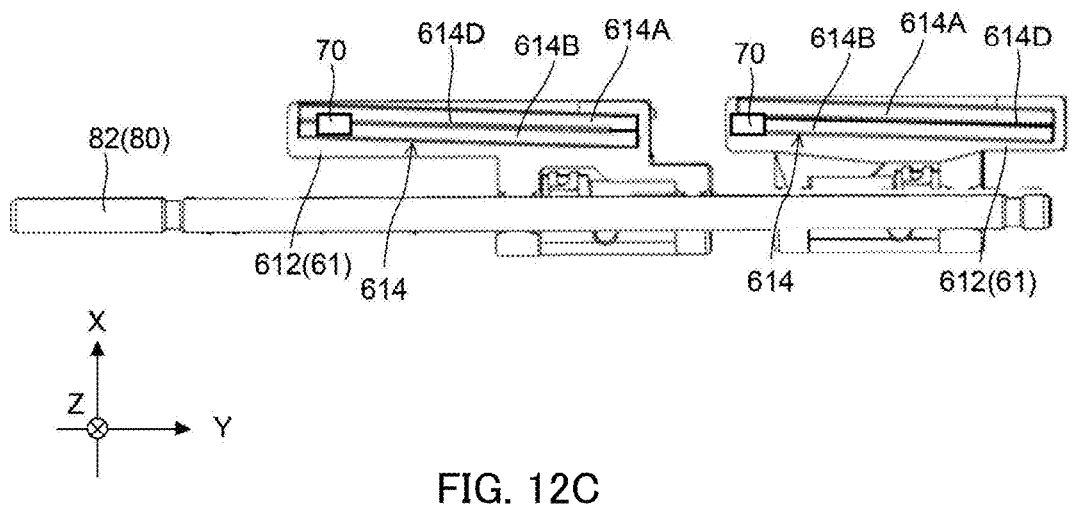
FIG. 12C is a diagram for explaining the positional relationship between the magnet and the position detecting part.

Further, as illustrated in FIGS. 12A, 12B and 12C, magnet parts 614 are disposed to be inclined with respect to the Y direction. That is, border 614D between the different poles in each of magnet parts 614 extends in an inclined manner with respect to the optical axis (Y direction).

With this configuration, the proportion of the N pole and the proportion of the S pole at an opposing portion between position detecting part 70 and magnet part 614 can be made different in accordance with the movement of frame 61 in the Z direction.

For example, as illustrated in FIG. 12A, when the position of frame 61 is at the end on the − side position in the Y direction, position detecting part 70 faces the end portion of magnet part 614 on the + side in the Y direction. Position detecting part 70 faces a portion of the end portion where the proportion of the N pole of magnet 614A is large.

When frame 61 is moved to the + side in the Y direction, magnet part 614 also moves with frame 61. Accordingly, the opposing portion of position detecting part 70 with respect to magnet part 614 changes. Since magnet part 614 is inclined, the proportion of the S pole at the opposing portion with respect to position detecting part 70 gradually increases.

As illustrated in FIG. 12B, when frame 61 moves to a position where position detecting part 70 faces the central portion of frame 61, a portion where the proportion of the S pole (magnet 614B) is substantially equal to the proportion of the N pole (magnet 614A) comes to the opposing portion with respect to position detecting part 70.

Further, as illustrated in FIG. 12C, when frame 61 moves to a position where position detecting part 70 faces the end portion of frame 61 on the + side in the Y direction, a portion where the proportion of the S pole (magnet 614B) is large comes to the opposing portion with respect to position detecting part 70.

Thus, the magnitude of the magnetic force detected by position detecting part 70 can be different between the positions of frame 61. It is thus possible to accurately detect the position of frame 61 in the Y direction by position detecting part 70.

Further, magnet parts 614 in lens driving parts 60 on both sides in the Y direction are disposed such that the same poles face each other when facing each other in the Y direction. That is, magnets 614A face each other at a position where magnet 614A of magnet part 614 on the + side in the Y direction is close to magnet 614A of magnet part 614 on the − side in the Y direction. Further, magnets 614B face each other at a position where magnet 614B of magnet part 614 on the − side in the Y direction is close to magnet 614B of magnet part 614 on the + side in the Y direction.

Thus, for example, even when frames 61 on lens driving parts 60 on both sides in the Y direction come the closest to each other, it is unlikely that magnet parts 614 of both frames 61 attract each other. It is thus possible to suppress the displacement of the positions of frames 61 in the Y direction.

Further, as illustrated in FIGS. 10 and 11, interposition part 63 is disposed above magnet holding portion 612. Interposition part 63 includes first interposition member 631 and second interposition member 632.

First interposition member 631 is formed of, for example, a flat plate-shaped metallic member, and is bonded to the surface of fourth portion 611D of frame 61 on the + side in the X-direction. Two protrusions D1 and D2 are disposed on the surface of fourth portion 611D on the + side in the X-direction.

Two protrusions D1 and D2 protrude from the surface of fourth portion 611D and are disposed side by side in the Y-direction. In the present embodiment, protrusion D1 is disposed near the end portion of fourth portion 611D on the − side in the Y direction, and protrusion D2 is disposed near the end portion of fourth portion 611D on the + side in the Y direction.

First interposition member 631 is disposed parallel to the direction of the optical axis (Y direction), and includes engaging holes 631A and 631B for engagement with two protrusions D1 and D2.

Engaging hole 631A is disposed near the central portion of first interposition member 631 in the Y-direction, and is engaged with protrusion D1. Engaging hole 631A is formed in a size allowing engagement with protrusion D1, and allowing interposition part 63 (first interposition member 631) to rotate around engaging hole 631A with which protrusion D1 is engaged.

Engaging hole 631B is disposed near the end portion of first interposition member 631 on the + side in the Y direction, and is engaged with protrusion D2. Engaging hole 631B is formed in a size allowing engagement with protrusion D2, and such that the inner edge of engaging hole 631B is spaced from protrusion D2 by a distance allowing movement of the engaging hole with respect to protrusion D2 (see FIG. 13B).

Figure 13A:
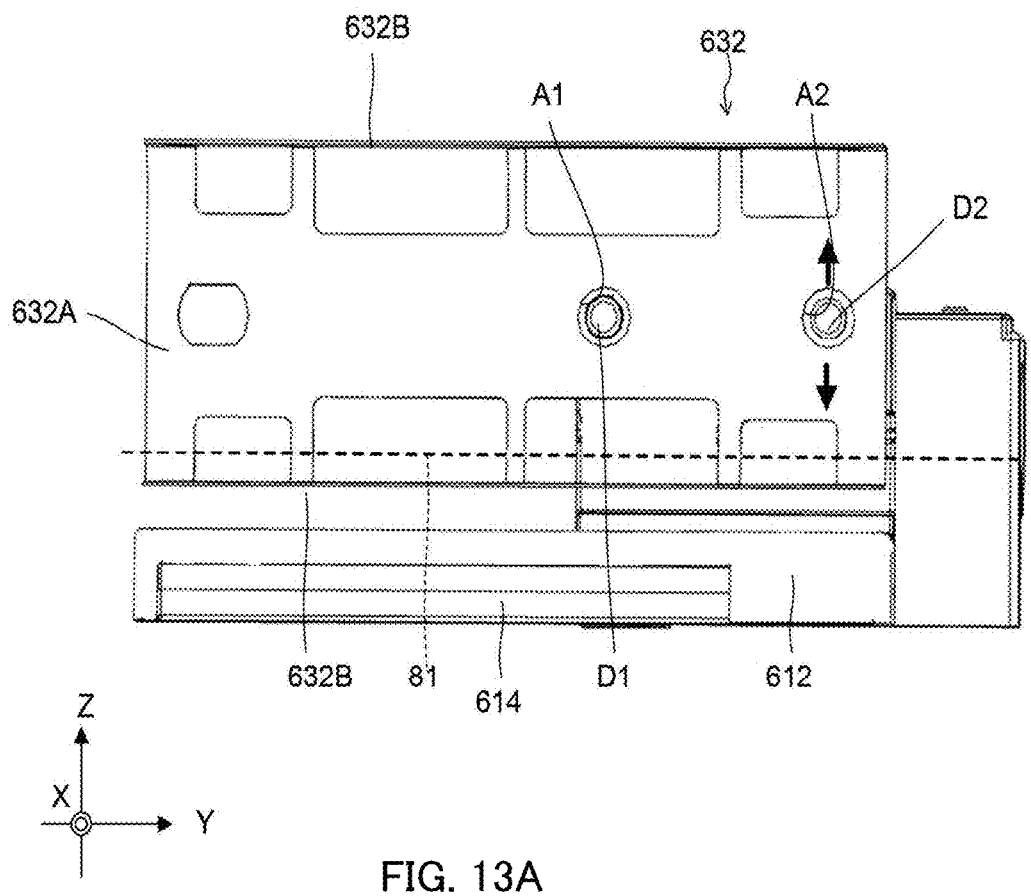
FIG. 13A is a diagram for explaining adjustment of the positional relationship between the interposition part and the guide shaft.
Figure 13B:
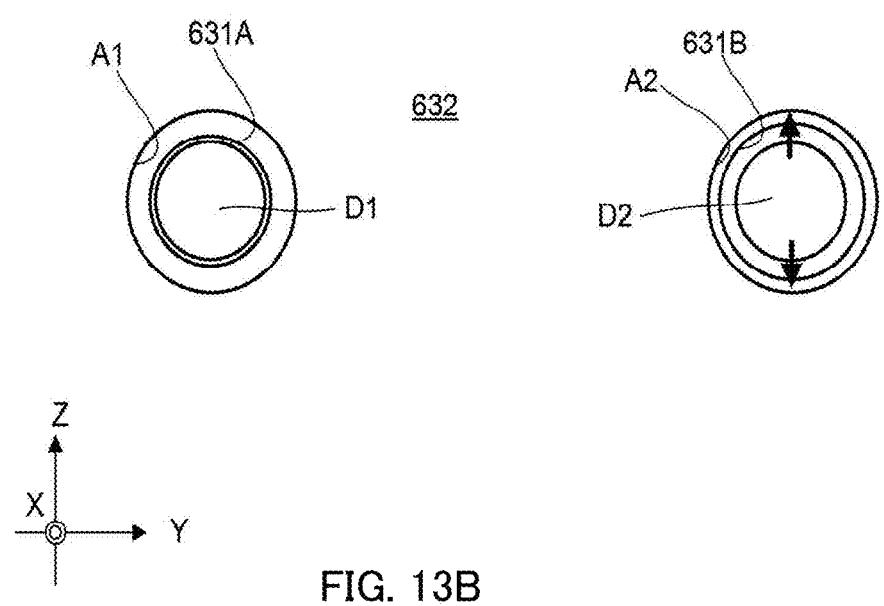
FIG. 13B is a diagram for explaining adjustment of the positional relationship between the interposition part and the guide shaft.

Engaging holes 631A and 631B thus formed make it possible to allow interposition part 63 to rotate around engaging hole 631A (protrusion D1) within the range of engaging hole 631B as illustrated in FIGS. 13A and 13B. As a result, the attitude of interposition part 63 can be adjusted so that contact portions 632B of interposition part 63 are parallel to the guide shaft.

As illustrated in FIG. 11, second interposition member 632 is formed of, for example, a plate-like metal member, and is adhesively fixed to, for example, first interposition member 631. Second interposition member 632 includes main body portion 632A and contact portions 632B.

Main body portion 632A is a portion that has a plane parallel to the direction of the optical axis (Y direction), and is adhesively fixed to first interposition member 631. Holes A1 and A2 through which two protrusions D1 and D2 of fourth portion 611D of frame 61 pass are formed in main body portion 632A.

Contact portions 632B are portions with which an oscillator of ultrasonic motor 64 makes contact, and are formed by bending the end portions of main body portion 632A on both sides in the Z-direction toward the side opposite to the lens part. Thus, main body portion 632A connecting together the pair of contact portions 632B is disposed to cover ultrasonic motor 64 from the − side in the X direction, and contact portions 632B are disposed to sandwich ultrasonic motor 64 (resonant portion 641).

Interposition part 63 thus configured generates a thrust in the direction of the optical axis (Y direction) in interposition part 63 by a force acting on contact portions 632B from the oscillator of ultrasonic motor 64. As a result, it is possible to impart a thrust from interposition part 63 to frame 61 for movement in the direction of the optical axis (Y direction).

Figure 14:
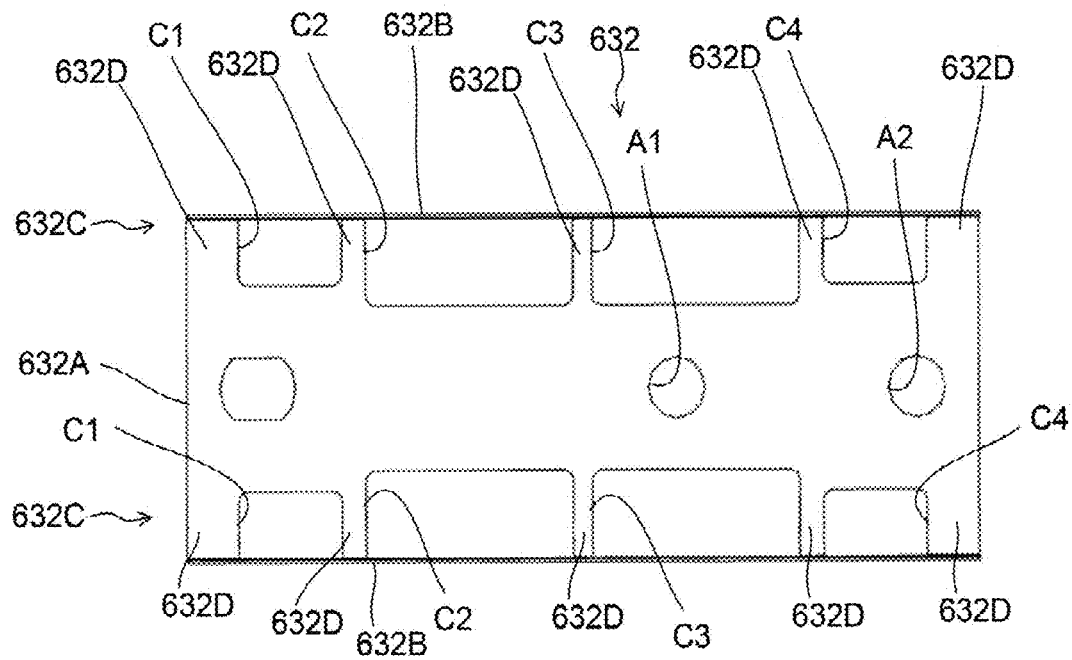
FIG. 14 is a diagram illustrating a second interposition member.
Figure 14:
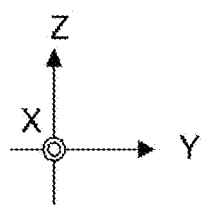

As illustrated in FIG. 14, a plurality of openings C1, C2, C3, and C4 are formed in connecting portions 632C between main body portion 632A and contact portions 632B. The plurality of openings C1, C2, C3, and C4 disposed side by side in the Y direction are four in number on each side of the connecting portions in the Y direction.

Of four openings C1, C2, C3, and C4, two openings C2 and C3 on the central side in the Y direction are configured to have lengths in the Y direction and in the Z direction that are longer than the lengths of two opening C1 and C4 on the opposite end sides in the Y direction.

Further, four openings C1, C2, C3, and C4 are formed, and thus, in connecting portions 632C, five connecting sections 632D disposed at intervals in the direction of the optical axis are formed.

The widths of connecting sections 632D in the Y direction (direction of the optical axis) increase in the order from the connecting section in the middle in the Y direction toward connecting section 632D located on the outer side in the present embodiment. Specifically, middle connecting section 632D in the Y-direction is the narrowest of five connecting sections 632D. Connecting sections 632D at opposite ends in the Y-direction are the widest of five connecting sections 632D. Connecting sections 632D located between middle connecting section 632D and connecting sections 632D at opposite ends are wider than middle connecting section 632D and narrower than connecting sections 632D at opposite ends.

The closer the connecting sections 632D is located to the end sides, the lower the strengths of connecting sections 632D (connecting portion 632C). Thus, in the present embodiment, the strengths of connecting portions 632C are adjusted by changing the sizes of openings C1, C2, C3, and C4 and the widths of connecting sections 632D in connecting portion 632C.

With the configuration as described above, it is possible to equalize the pressing force applied by oscillator 641B at each position of contact portion 632B in the entire Y-direction. As a result, in the device mounted in a portable terminal such as a smart phone, for example, the moving force by interposition part 63 can be stably generated during operation of the stepless optical zoom function even when the movable part is moved within a relatively long movement range.

Figure 15:
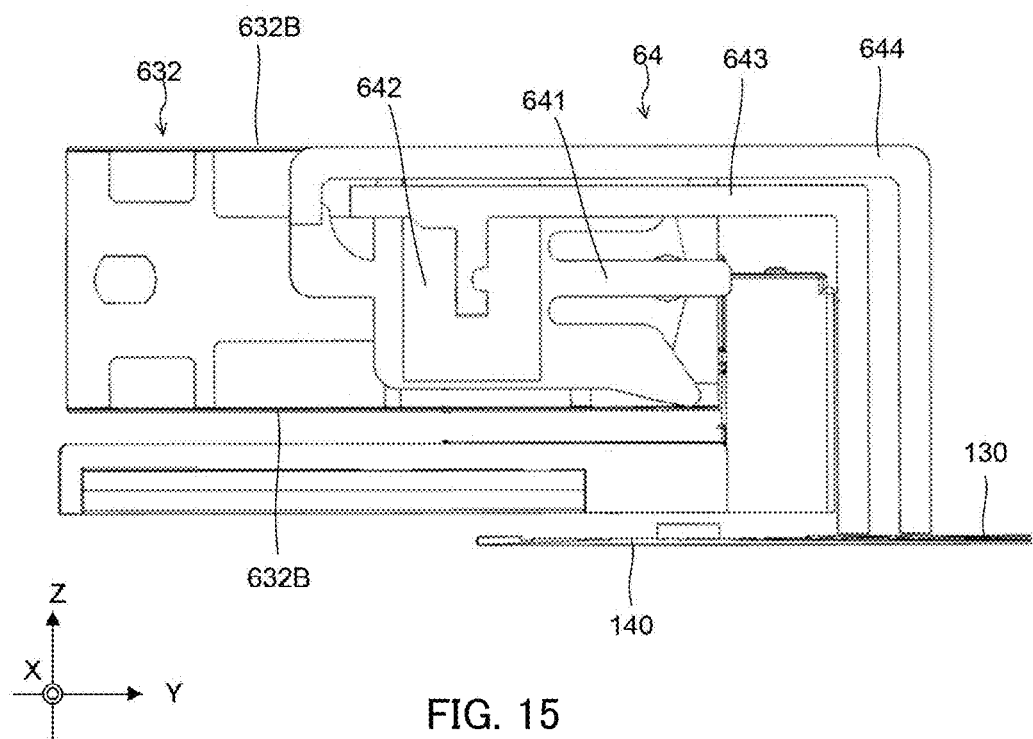
FIG. 15 is a diagram illustrating the arrangement relationship between the interposition part and an ultrasonic motor.
Figure 16:
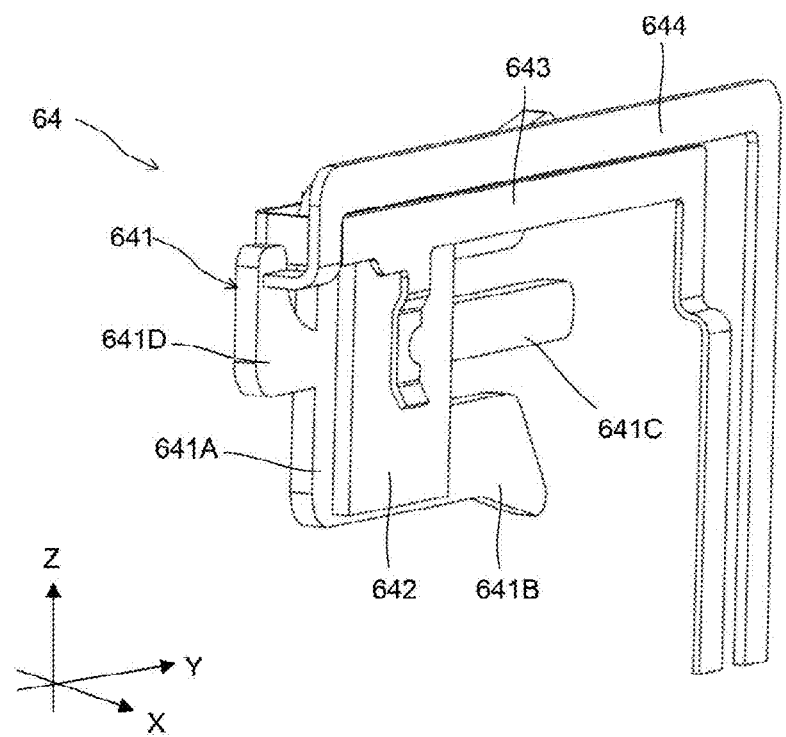
FIG. 16 is a perspective view of the ultrasonic motor.

As illustrated in FIGS. 15 and 16, ultrasonic motor 64 is a driving source for generating a driving force for moving frame 61, and is fixedly disposed on each of placement portions 111A of first wall 111 on the + side in the X direction (see FIG. 3 or the like). Ultrasonic motor 64 includes resonant portion 641, piezoelectric elements 642, first electrode 643, and second electrode 644.

One of ultrasonic motors 64 on the − side in the Y direction corresponds to the "first ultrasonic motor" of the present invention, and the other one of ultrasonic motors 64 on the + side in the Y direction corresponds to the "second ultrasonic motor" of the present invention.

Figure 17:
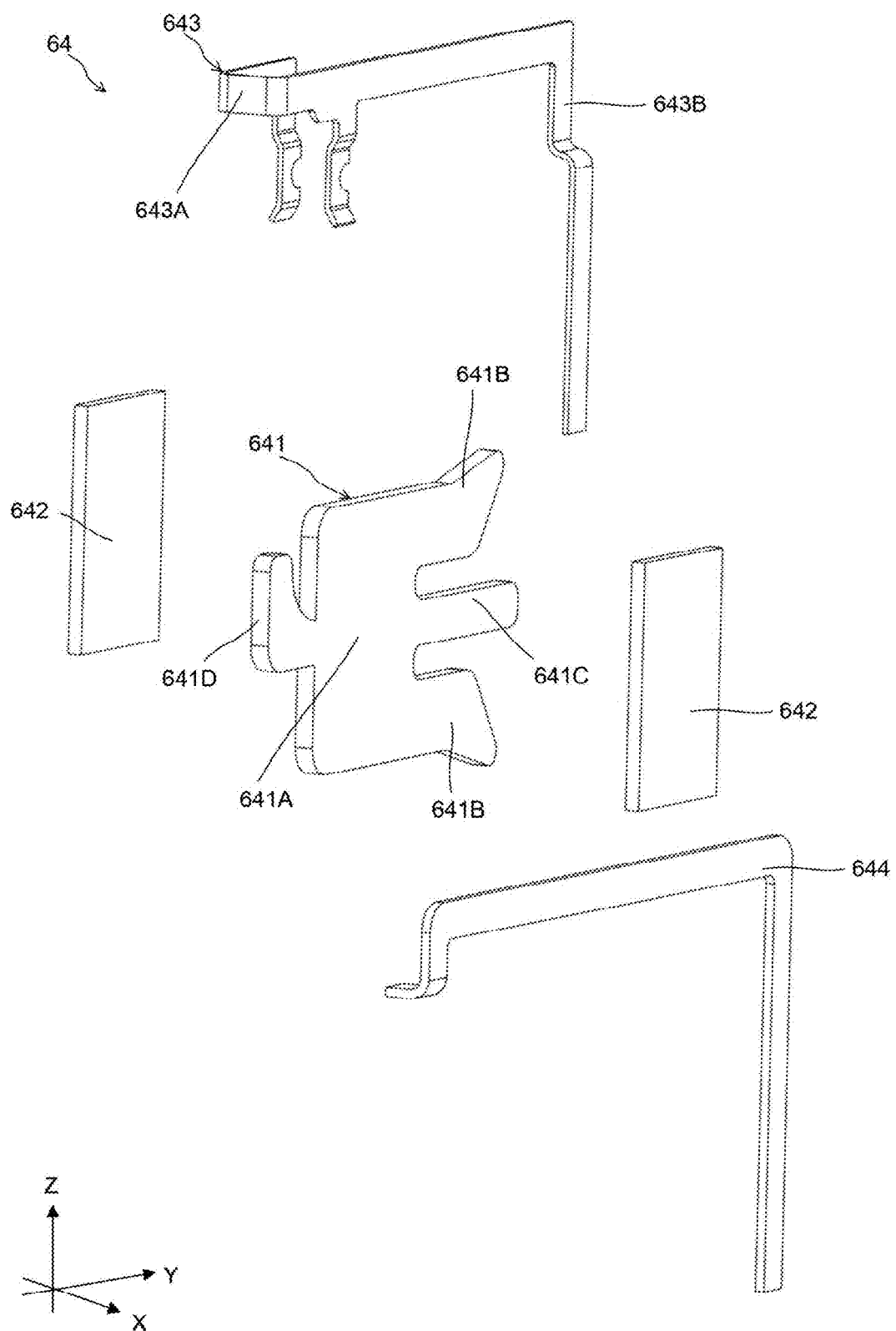
FIG. 17 is an exploded perspective view of the ultrasonic motor.

Resonant portion 641 is formed of, for example, a conductive material and resonates with the vibration of piezoelectric elements 642 to convert a vibrational motion into a linear motion of frame 61. Specifically, resonant portion 641 vibrates in an inclination direction inclined with respect to the direction of the optical axis (Y direction) based on the vibration of piezoelectric elements 642 so as to press interposition part 63. Accordingly, a thrust to move frame 61 via interposition part 63 in the direction of the optical axis is generated. Resonant portion 641 is disposed to be sandwiched between two contact portions 632B of interposition part 63. As illustrated in FIG. 17, resonant portion 641 includes body portion 641A, two oscillators 641B, protruding portion 641C, and energization portion 641D.

Body portion 641A is configured in a substantially rectangular shape, for example, and is a portion sandwiched between piezoelectric elements 642. Two oscillators 641B extend in the Y-direction from opposite end portions of body portion 641A in the Z-direction. Two oscillators 641B have symmetrical shapes, and their respective free end portions make contact with contact portions 632B of interposition part 63.

Protruding portion 641C extends to the + side in the Y direction from the central portion of body portion 641A in the Z direction. Energization portion 641D extends to the side opposite to protruding portion 641C (the – side in the Y direction) from the central portion of body portion 641A in the Z direction.

Each of piezoelectric elements 642 is, for example, a vibration element formed of a ceramic material in a plate shape, and generates vibration by application of a high-frequency voltage. Two piezoelectric elements 642 are disposed to sandwich body portion 641A of resonant portion 641 in the X-direction, respectively.

First electrode 643 includes clamping portion 643A for clamping resonant portion 641 and piezoelectric elements 642, and electrode portion 643B to which a voltage is applied. Via clamping portion 643A for clamping piezoelectric elements 642 and the like, first electrode 643 applies a voltage to piezoelectric elements 642. Second electrode 644 is electrically connected to energization portion 641D of resonant portion 641. First electrode 643 and second electrode 644 make contact with above-described terminal part 130 inside housing 10 (see FIG. 15).

Two piezoelectric elements 642 are bonded to body portion 641A of resonant portion 641 and are held in between by first electrode 643, so that these are electrically connected to one another. For example, one side of a power supply path is connected to first electrode 643, and the other side is connected to second electrode 644. A voltage is applied to piezoelectric elements 642, and a vibration is thus generated.

Resonant portion 641 has at least two resonant frequencies, and deforms in behaviors different between the resonant frequencies. In other words, the entire shape of resonant portion 641 is set such that resonant portion 641 deforms in behaviors different between the two resonant frequencies. The different behaviors mean behaviors of moving frame 61 to the + side and to the – side in the Y direction via interposition part 63.

Figure 18:
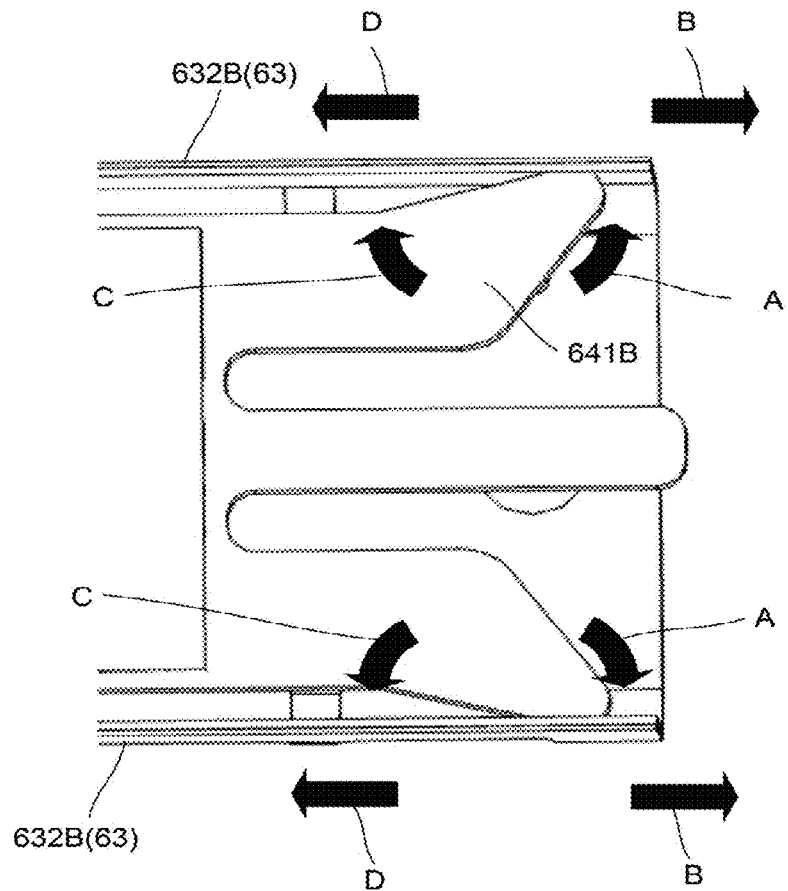
FIG. 18 is an enlarged view of a contact portion between a resonant portion and the interposition part.

As illustrated in FIG. 18, resonant portion 641 is disposed such that either of the pair of contact portions 632B of interposition part 63 and oscillators 641B face each other. Thus, when two oscillators 641B are deformed, the tip ends of oscillators 641B press (see arrows A) contact portions 632B in a direction inclined with respect to the Y direction from the opposing sides of contact portions 632B.

When contact portions 632B are pressed in the directions of arrows A by the tip ends of oscillators 641B, reaction forces of the contact portions returning on the oscillators 641B sides are generated at contact portions 632B. In other words, interposition part 63 generates a reaction force in a direction from the outside of the pair of contact portions 632B toward the inside based on the contact between oscillators 641B and the pair of contact portions 632B.

By the reaction force of interposition part 63 with respect to the press of oscillators 641B, the friction generated between oscillators 641B and contact portions 632B causes a thrust in the Y direction in interposition part 63. Accordingly, the thrust for movement in the Y direction is applied to frame 61 to be bonded to interposition part 63 (see arrow B). As a result, second lens unit 32 or third lens unit 33 connected to frame 61 is moved in the Y direction.

Further, contact portions 632B are configured to extend in the Y direction. When pressed against oscillators 641B, contact portions 632B move in the Y direction while making sliding contact with oscillators 641B. Therefore, contact portions 632B are continuously pressed by oscillators 641B. Thus, frame 61 to be bonded to interposition part 63 can be moved continuously in the Y-direction. Note that, at a certain resonant frequency, the pressing directions of oscillators 641B are the directions of arrows A and the sliding direction of contact portions 632B is the direction of arrows B, whereas at another resonance frequency, the pressing directions of oscillators 641B are the directions of arrows C and the sliding direction of contact portions 632B is the direction of arrows D.

Such driving operation is performed by each of ultrasonic motors 64 disposed on each of first walls 111 on both sides in the X direction. That is, ultrasonic motors 64 respectively drive second lens unit 32 and third lens unit 33 independently in the direction of the optical axis.

Figure 19:
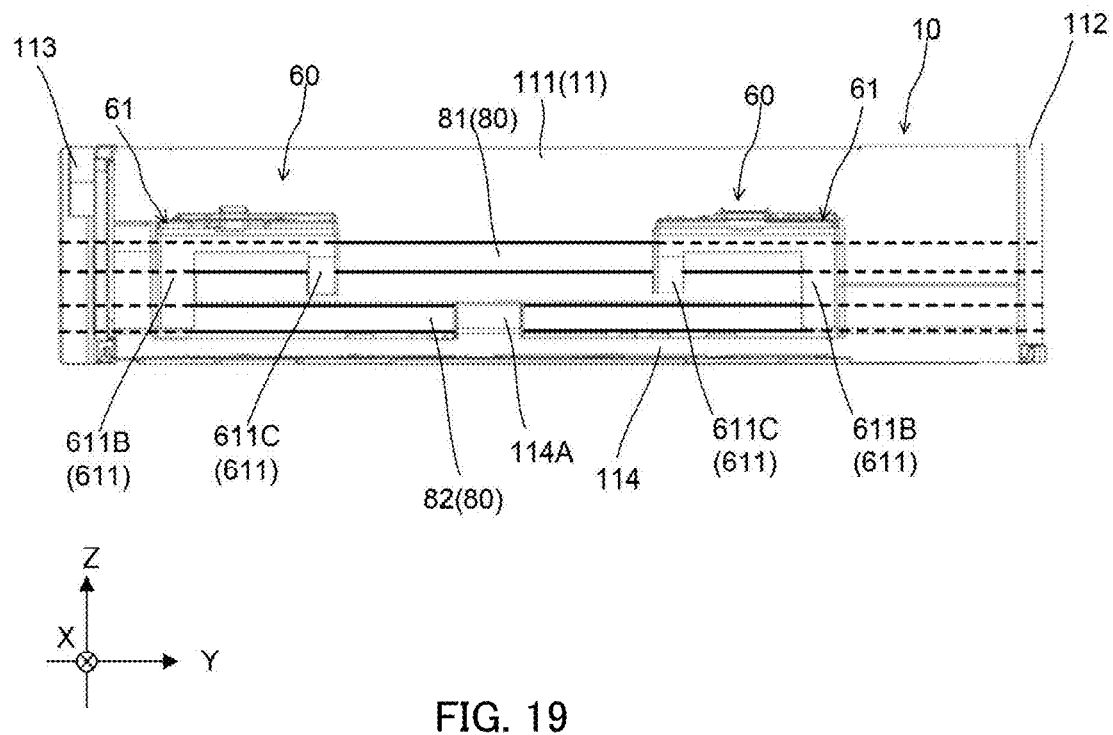
FIG. 19 is a diagram for explaining the configuration of the guide part.

As illustrated in FIG. 19, their movements are guided by guide part 80. Guide part 80 is disposed in the region of one of fourth walls 114 on the + side in the X direction that is surrounded by first wall 111, second wall 112, and third wall 113. That is, guide part 80 is disposed in housing 10 on one end side of opposite ends of second lens unit 32 and third lens unit 33 with respect to optical axis O (see also FIG. 7).

Guide part 80 includes first guide shaft 81 and second guide shaft 82, both of which extend in the direction of the optical axis (Y direction). The first and the second guide shafts are disposed to be spaced apart from each other and cooperate to support both of two frames 61 such that the frames are movable in the direction of the optical axis. First guide shaft 81 and second guide shaft 82 are formed from, for example, stainless steel or the like, and are supported by guide supporting portions (not illustrated) of second wall 112 and third wall 113 of housing 10 at opposite end sides in the optical axis (opposite end sides in the X direction).

First guide shaft 81 is a guide shaft for guiding the movement of each of frames 61 by supporting second portion 611B and third portion 611C of guided portion 611 of frame 61.

Second guide shaft 82 is a guide shaft disposed parallel to first guide shaft 81 on the – side (fourth wall 114 side) of first guide shaft 81 in the Z direction, and for guiding the movement of frame 61 by supporting (being engaged with) second portion 611B of guided portion 611 of frame 61. In addition, first guide shaft 81 and second guide shaft 82 are disposed at substantially the same position in the X direction as one of above-described support shafts 50, as illustrated in FIG. 10. As is understood, the two guide shafts, first guide shaft 81 and second guide shaft 82, are disposed for guiding the movement of lens driving parts 60. It is thus possible to improve the strength of housing 10.

Second guide shaft 82 is supported by bearing portion 114A disposed on fourth wall 114. Bearing portion 114A is disposed between two frames 61 to protrude from fourth wall 114 to the + side in the Z direction, and is disposed in the vicinity of the central portion of second guide shaft 82 in the Y direction. Second guide shaft 82 is adhesively fixed to bearing portion 114A. Further, bearing portion 114A is disposed in a range including center 82A of second guide shaft 82 in the X direction (direction between opposite ends with respect to the optical axis) (see FIG. 10).

Figure 20:
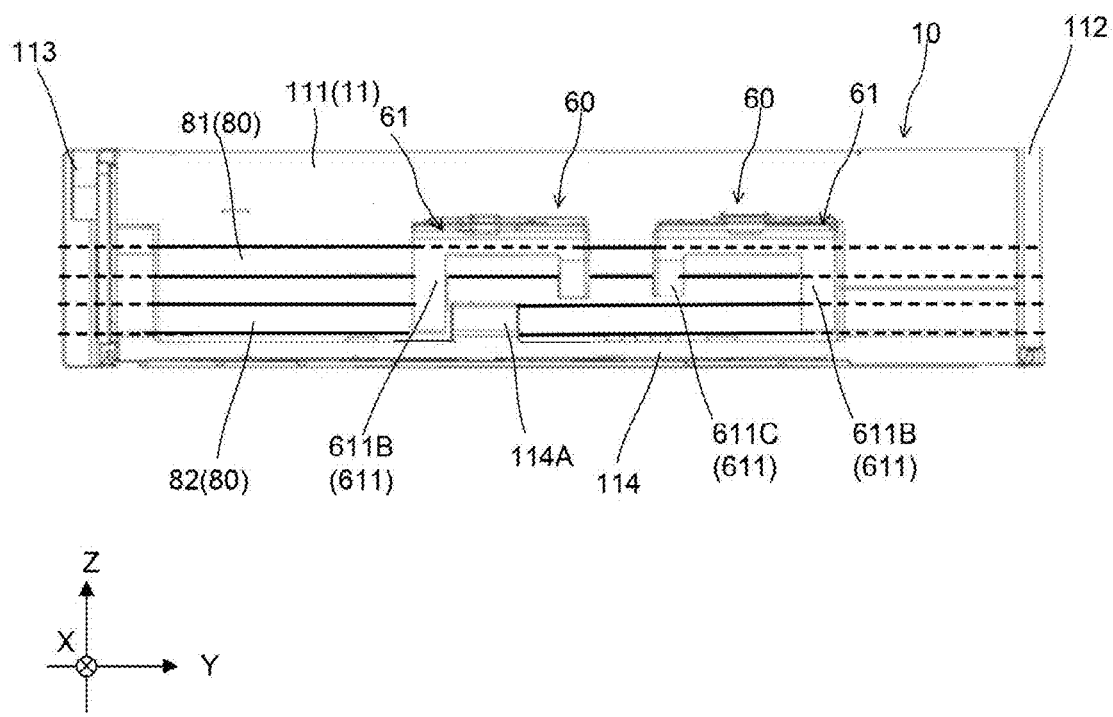
FIG. 20 is a diagram for explaining the configuration of the guide part.

Further, bearing portion 114A is disposed at a position where contact with second portion 611B of frame 61 is possible. Therefore, when frame 61 is moved to the + side in the Y direction, second portion 611B and bearing portion 114A of frame 61 make contact with each other (see FIG. 20). Thus, bearing portion 114A restricts the movement of frame 61.

Figure 21A:
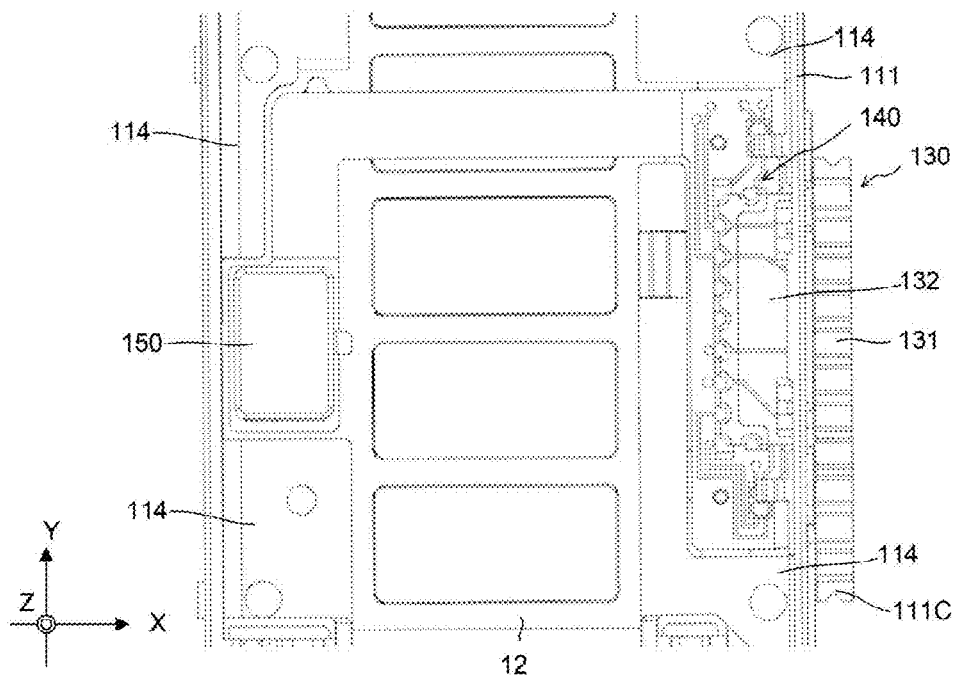
FIG. 21A is a partial enlarged view of a terminal part, a board part, and a boosting placement portion in the housing.
Figure 21B:
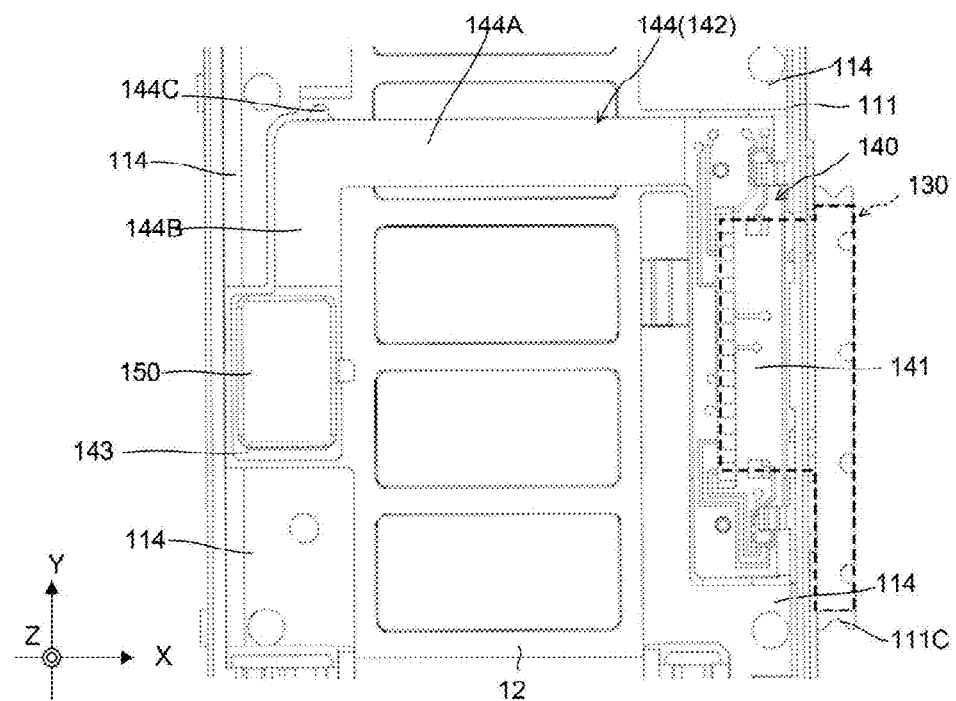
FIG. 21B is a partial enlarged view of the board part and the boosting placement portion in the housing.

As illustrated in FIGS. 21A and 21B, terminal part 130 is disposed across the inside and outside of housing 10 via a gap formed between first wall 111 situated on the + side in the X-direction and bottom wall portion 12, for example. Terminal part 130 includes outer terminal portion 131 connected to interconnections from the outside (camera-mounted device), and inner terminal portion 132 electrically conductively connected with board part 140 situated inside of housing 10

Figure 22:
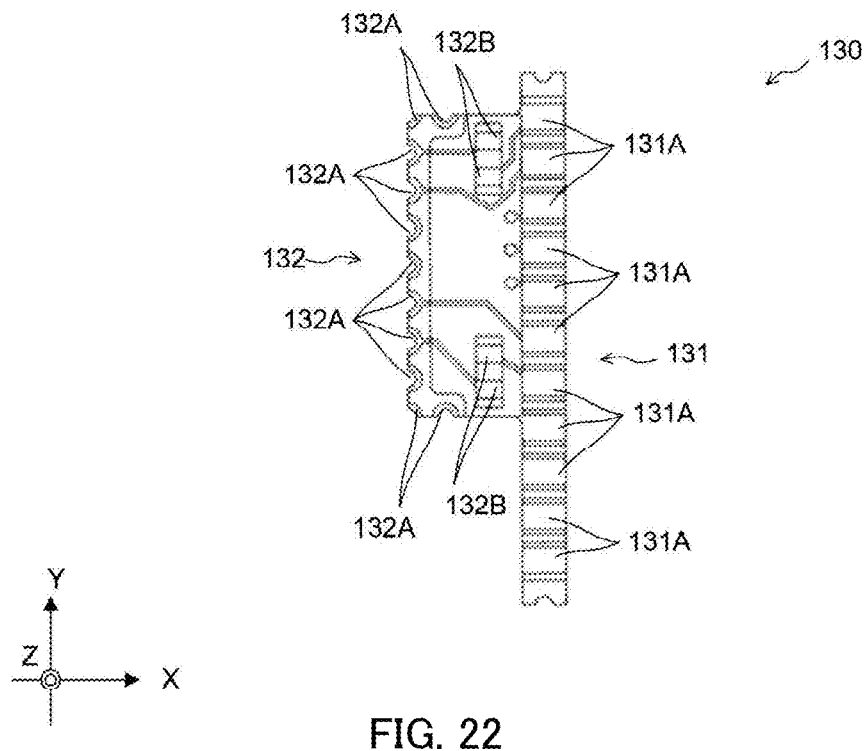
FIG. 22 illustrates the terminal part.

As illustrated in FIG. 22, outer terminal portion 131 is a portion disposed on aforementioned terminal placement portion 111C, and includes a plurality of external terminals 131A. Inner terminal portion 132 is a portion disposed on board part 140 disposed at a position corresponding to fourth wall 114 situated inside of housing 10 on the + side in the X-direction, and includes a plurality of conduction terminals 132A and driving terminals 132B.

Conduction terminals 132A are terminals for allowing conduction between the input/output terminals of board part 140 and external terminals 131A. Driving terminals 132B are terminals making contact with the electrodes of aforementioned ultrasonic motors 64 and inputting/outputting voltage for driving ultrasonic motors 64.

Figure 23:
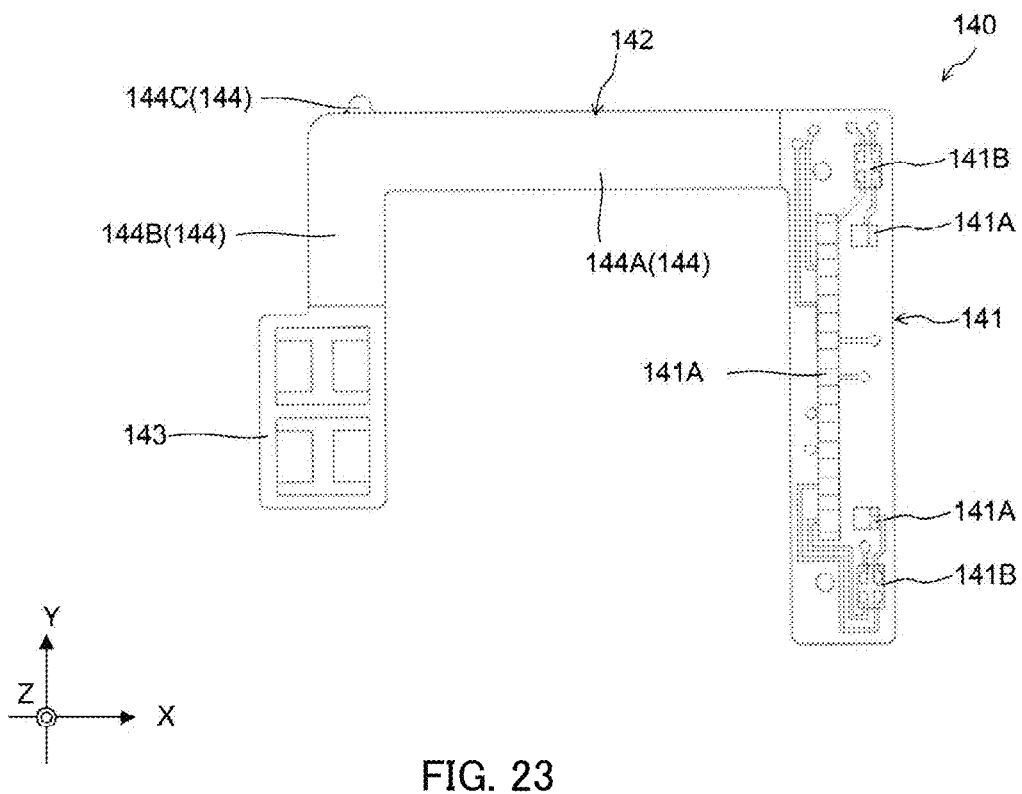
FIG. 23 illustrates the board part.

As illustrated in FIGS. 21B and 23, board part 140 is a circuit board that, for example, includes interconnections for inputting the drive voltage of camera module 1, interconnections for outputting a detection signal of position detecting parts 70 to the outside, and/or the like. Board part 140 is formed from a flexible board and includes first board 141 and second board 142. First board 141 and second board 142 are formed integrally with each other. First board 141 corresponds to the "first flexible board" of the present invention, and second board 142 corresponds to the "second flexible board" of the present invention.

First board 141 is a board disposed at a position corresponding to fourth wall 114 situated on the + side in the X-direction, and is formed to extend in the Y-direction. First board 141 includes input/output terminals 141A electrically conductively connected with inner terminal portion 132 of terminal part 130, and detection terminals 141B connected to position detecting parts 70 (Hall elements).

Input/output terminals 141A are disposed at positions corresponding to inner terminal portion 132 of terminal part 130. Detection terminals 141B are disposed respectively on the end portion on the + side in the Y-direction and the end portion on the − side in the Y-direction correspondingly to position detecting parts 70 of two lens driving parts 60.

Figure 24:
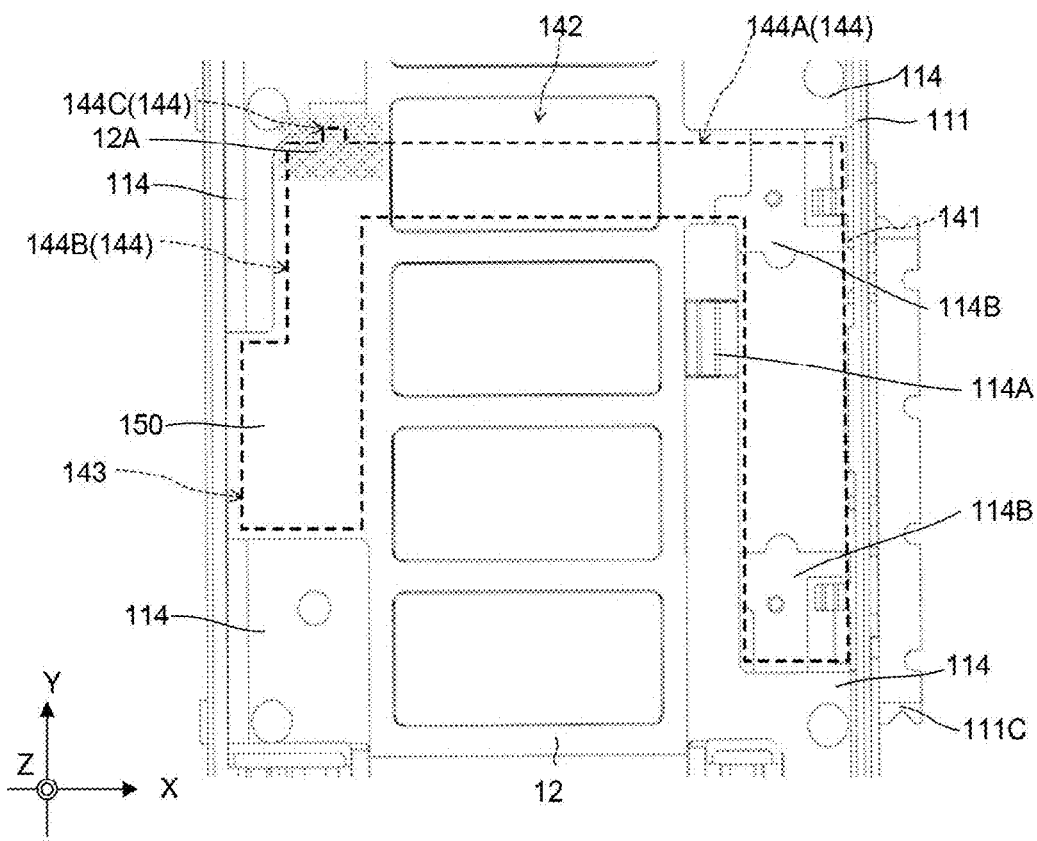
FIG. 24 illustrates a state where the board part of the housing is removed.
Figure 25:
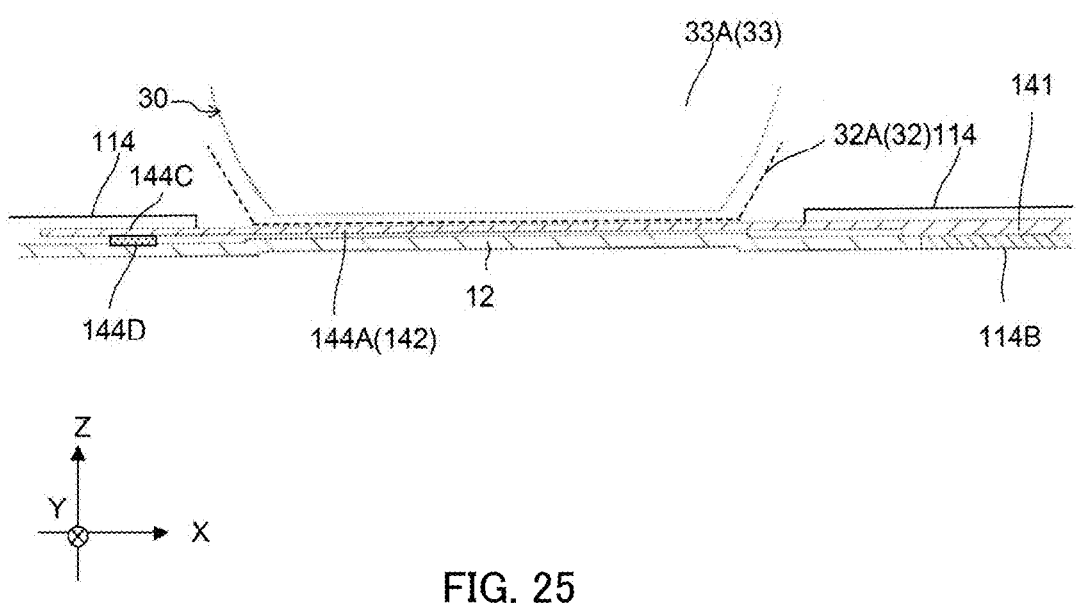
FIG. 25 illustrates a positional relationship between a fourth wall, a first board, a second board, and a lens unit.

Further, as illustrated in FIGS. 24 and 25, board placement portion 114B is disposed on a portion of fourth wall 114 which is situated on the + side in the X-direction and which corresponds to first board 141. At positions corresponding to the opposite end portions of first board 141 in the Y-direction, board placement portions 114B are disposed at positions where the surface of fourth wall 114 is depressed on the − side in the Z-direction.

Specifically, board placement portions 114B are disposed at positions where the amount of depression in the surface of fourth wall 114 is larger than the thickness of first board 141 and second board 142. In other words, the surface of fourth wall 114 is located to protrude beyond first board 141 and second board 142.

A portion of fourth wall 114 between two board placement portions 114B is cut out, and first board 141 corresponding to such a portion is disposed to face bottom wall portion 12.

In addition, a portion of fourth wall 114 corresponding to second board 142 is also formed to be cut out. Specifically, fourth wall 114 situated on the + side in the X-direction is cut out at a portion corresponding to a connecting portion between first board 141 and first extending portion 144A described below. Further, fourth wall 114 situated on the − side in the X-direction is cut out at portions corresponding to below-described boosting placement portion 143, second extending portion 144B, and grounding portion 144C. Thus, fourth wall 114 does not exist at the portion at which second board 142 is disposed. Accordingly, second board 142 is disposed to face bottom wall portion 12.

As illustrated in FIGS. 21B and 23, second board 142 is a board including the interconnections for allowing conduction between boosting part 150 and lens driving part 60, and includes boosting placement portion 143 and board connection portion 144.

Boosting placement portion 143 is a board on which boosting part 150 is disposed, and is disposed at a position corresponding to a substantially central portion of fourth wall 114 in the Y-direction that is situated on the − side in the X-direction. Two inductors 150A and 150B, which will be described below, are disposed on boosting placement portion 143 along the Y-direction (see FIG. 27).

Board connection portion 144 is a board for connecting first board 141 to boosting placement portion 143, and includes first extending portion 144A, second extending portion 144B, and grounding portion 144C.

First extending portion 144A is configured to extend in the X-direction from the end portion of first board 141 on the + side in the Y-direction which is situated on the + side in the X-direction. First extending portion 144A is disposed to extend from the portion corresponding to fourth wall 114 on the + side in the X-direction to the portion corresponding to fourth wall 114 on the − side in the X-direction. Further, first extending portion 144A is disposed at a position corresponding to a moving range of third lens unit 33 in lens part 30.

In addition, as described above, first board 141 is disposed on board placement portion 114B as illustrated in FIG. 25. Thus, first extending portion 144A is disposed at a position on the − side in the Z-direction with respect to the surface of fourth wall 114, that is, at a position away from lens part 30. Consequently, it is possible to make it less likely for first extending portion 144A of second board 142 to interfere with lens part 30 in comparison with a configuration in which board part 140 is disposed on the surface of fourth wall 114.

In addition, by forming second board 142 from a flexible board, it is possible to form second board 142 comparatively thinly. Thus, it is possible to make it even less likely for second board 142 to interfere with lens part 30.

In addition, the bottom surface of main body portion 33A of third lens unit 33 is situated on the + side in the Z-direction with respect to the bottom surface of main body portion 32A of second lens unit 32, and is situated on the + side in the Z-direction with respect to the surface of first extending portion 144A of second board 142. Since first extending portion 144A of second board 142 is disposed at the position corresponding to the moving range of third lens unit 33 as described above, first extending portion 144A is disposed at a position such that third lens unit 33 is not interfered.

Thus, even when first extending portion 144A of second board 142 is disposed in the moving range of lens part 30, interference of first extending portion 144A with lens part 30 can be suppressed.

As illustrated in FIGS. 21B and 23, second extending portion 144B is disposed at the position corresponding to fourth wall 114 situated on the − side in the X-direction, extends on the − side in the Y-direction from the end portion of first extending portion 144A on the − side in the X-direction, and is connected to boosting placement portion 143. In addition, image capturing part 40 (image capturing device) is disposed on second wall 112 of housing 10. Thus, second extending portion 144B extends away from image capturing part 40.

In addition, grounding portion 144C is a portion to be grounded via bottom wall portion 12 of second board 142. Grounding portion 144C is disposed at a portion of first extending portion 144A corresponding to fourth wall 114 situated on the − side in the X-direction, and is formed to protrude at this portion toward the + side in the Y-direction from the end surface of first extending portion 144A situated on the + side in the Y-direction.

Further, as illustrated in FIG. 24, portion 12A of bottom wall portion 12 corresponding to grounding portion 144C is plated with gold. Further, the back surface of grounding portion 144C is plated with copper, which will be described below. In addition, as illustrated in FIG. 25, grounding portion 144C and bottom wall portion 12 are joined to each other by joining member 144D such as solder.

Thus, grounding portion 144C is electrically conductively connected with bottom wall portion 12. Bottom wall portion 12 is grounded as described above and, thus, grounding portion 144C is grounded. In addition, it is possible to make it easier for grounding portion 144C and bottom wall portion 12 to be electrically conductively connected with each other by bottom wall portion 12 plated with gold.

Figure 26:
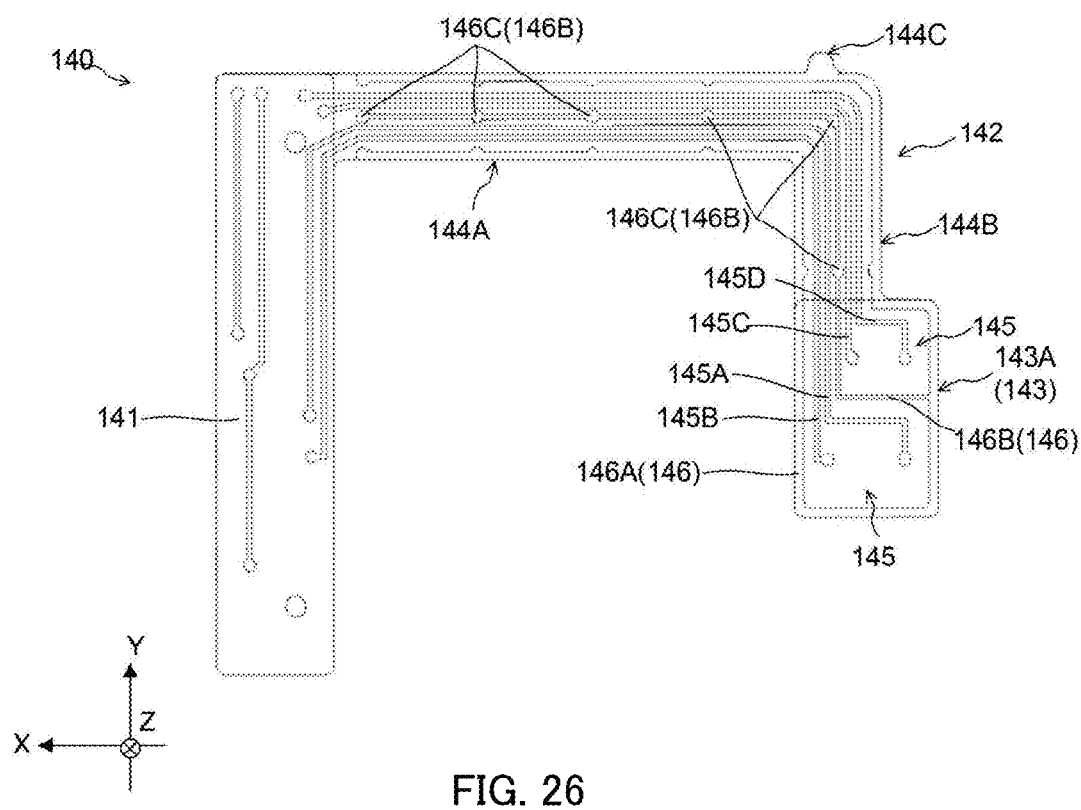
FIG. 26 illustrates the back side of the board part.

Further, as illustrated in FIG. 26, interconnection portion 145 and shield portion 146 are disposed on the back surface (surface on the − side in the Z-direction) of second board 142. Interconnection portion 145 includes first input interconnection 145A, first output interconnection 145B, second input interconnection 145C, and second output interconnection 145D.

First input interconnection 145A, first output interconnection 145B, second input interconnection 145C, and second output interconnection 145D are disposed to extend along the shape of second board 142.

First input interconnection 145A and first output interconnection 145B are interconnections corresponding to below-described inductor 150A on the − side in the Y-direction, and second input interconnection 145C and second output interconnection 145D are interconnections corresponding to below-described inductor 150B on the + side in the Y-direction.

Thus, first input interconnection 145A and first output interconnection 145B are formed to be elongated on the − side in the Y-direction beyond second input interconnection 145C and second output interconnection 145D at boosting placement portion 143 on account of the positional relationship between inductors 150A and 150B.

First input interconnection 145A and second input interconnection 145C are interconnections to which the input voltage to inductors 150A and 150B is inputted.

First output interconnection 145B and second output interconnection 145D are interconnections for outputting to ultrasonic motor 64 the output voltage that is the aforementioned input voltage boosted by inductors 150A and 150B.

First input interconnection 145A and first output interconnection 145B are located to be surrounded by second input interconnection 145C and second output interconnection 145D. Specifically, first input interconnection 145A and first output interconnection 145B are disposed in a region of first extending portion 144A on the − side in the Y-direction with respect to second input interconnection 145C and second output interconnection 145D. In addition, first input interconnection 145A and first output interconnection 145B are disposed in the region of second extending portion 144B on the − side in the X-direction with respect to second input interconnection 145C and second output interconnection 145D.

First output interconnection 145B is disposed along the edge of second board 142 on the − side in the Y-direction or on the + side in the X-direction. First input interconnection 145A is disposed on second board 142 inside of first output interconnection 145B.

Second output interconnection 145D is disposed along the edge of second board 142 on the + side in the Y-direction or on the − side in the X-direction. Second input interconnection 145C is disposed on second board 142 inside of second output interconnection 145D.

That is, first input interconnection 145A and second input interconnection 145C are disposed at positions adjacent to each other on second board 142.

Thus, it is possible to separate, from each other, first output interconnection 145B second output interconnection 145D corresponding to the output voltage boosted by inductors 150A and 150B. It is thus possible to reduce influence of a magnetic noise against the output voltage.

Shield portion 146 is a portion for shielding interconnection portion 145 from a noise, and includes first shield 146A and second shield 146B.

First shield 146A is disposed to surround interconnection portion 145, for example, by copper plating performed on the edge portions of first extending portion 144A and second extending portion 144B, and on the portion of grounding portion 144C.

Further, grounding portion 144C is grounded as described above. Thus, first shield 146A is grounded via grounding portion 144C. It is thus possible to reduce influence of noise on interconnection portion 145 from the outside of second board 142.

Second shield 146B is disposed to extend along first input interconnection 145A and second input interconnection 145C between first input interconnection 145A and second input interconnection 145C from a position of a portion of first shield 146A corresponding to boundary 143A of two inductors 150A and 150B at boosting placement portion 143.

Accordingly, the region of first input interconnection 145A and first output interconnection 145B and the region of second input interconnection 145C and second output interconnection 145D are separated from each other by second shield 146B. Second shield 146B corresponds to the "separation portion" of the present invention.

Consequently, it is possible to reduce influence of cross talk between two inductors 150A and 150B.

Further, a plurality of through holes 146C are formed in portions corresponding to second shield 146B. Second shield 146B is connected to the surface of second board 142 via through holes 146C.

In addition, the surface of second board 142 is plated with copper. Thus, the surface of second board 142 is electrically conductively connected with second shield 146B. Accordingly, the surface of second board 142 also is grounded.

It is thus possible to suppress propagation of the noise from the surface side of second board 142 to interconnection portion 145.

Figure 27:
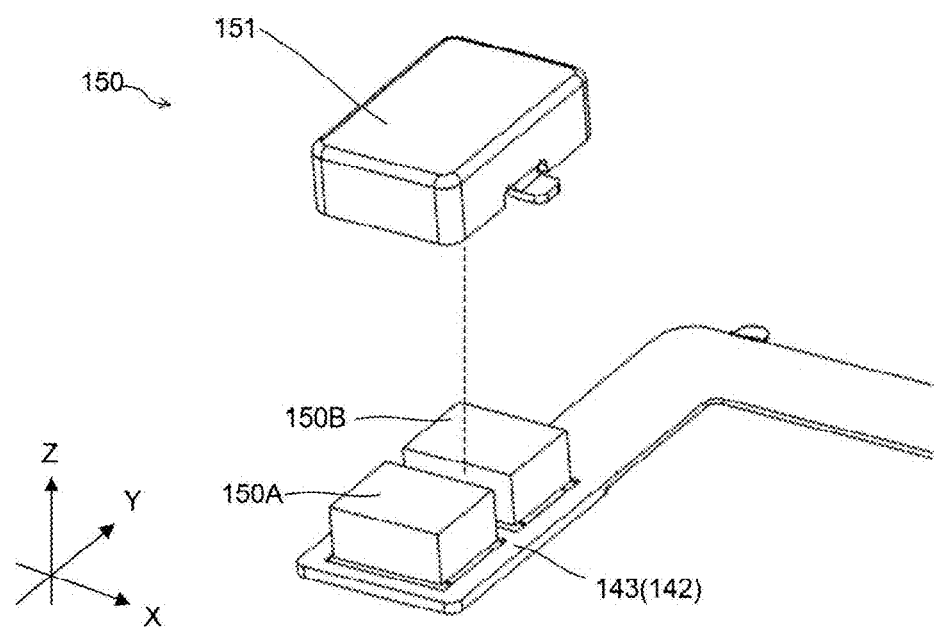
FIG. 27 is an exploded perspective view of a boosting part.

As illustrated in FIG. 27, boosting part 150 includes two inductors 150A and 150B and cover portion 151. Inductors 150A and 150B are coil elements, for example, and are disposed on boosting placement portion 143 side by side along the Y-direction. Inductor 150A on the − side in the Y-direction corresponds to lens driving part 60 on the − side in the Y-direction, and inductor 150B on the + side in the Y-direction corresponds to lens driving part 60 on the + side in the Y-direction.

Inductors 150A and 150B are electrically conductively connected with first board 141 and terminal part 130 by aforementioned interconnection portion 145. Inductors 150A and 150B boost the input voltage inputted via interconnection portion 145, and supply the boosted output voltage to ultrasonic motor 64 via interconnection portion 145.

In the meantime, in a configuration not including an inductor in a housing, it is necessary to provide, in a camera-mounted device, a space in which the inductor is disposed. Further, inductors are quite different individually. In the case where an inductor is disposed separately from a camera module, it may happen that the characteristics of an inductor used at the time of delivery of the camera module differ from the characteristics of an inductor mounted in a camera-mounted device. Thus, a user will need to adjust the inductor separately in consideration of relationship with the camera module.

Therefore, the configuration of the camera module using an ultrasonic motor, in which no inductor is disposed, is not user-friendly.

In contrast, in the present embodiment, inductors 150A and 150B are disposed in housing 10. It is thus unnecessary to provide, in a camera-mounted device, a space in which an inductor is disposed. It is also unnecessary for a user to adjust the inductor separately in consideration of relationship with camera module 1. Consequently, the present embodiment makes it possible to improve user-friendliness.

Cover portion 151 is made of iron (SPCC etc.), for example, and is formed in a box shape corresponding to the region of boosting placement portion 143. Cover portion 151 is disposed to cover two inductors 150A and 150B.

By disposing cover portion 151, it is possible to suppress influence of the magnetic field generated from inductors 150A and 150B on other elements and the like.

According to the present embodiment configured as described above, inductors 150A and 150B are disposed in housing 10. It is thus possible to enhance user-friendliness.

In addition, boosting part 150 is disposed in the region on the − side in the X-direction in which none of lens driving parts 60 is disposed. It is thus possible to use a vacant space in housing 10 effectively.

Further, board part 140 is formed of a flexible board. It is thus possible to form board part 140 entirely thinly. Accordingly, it is possible to reduce influence caused by board connection portion 144 existing in the region in which lens part 30 is located.

Further, board connection portion 144 does not interfere with third lens unit 33. It is thus possible to further reduce the influence caused by board connection portion 144 existing in the region in which lens part 30 is located.

In addition, the surface of fourth wall 114 is located to protrude beyond second board 142. It is thus unnecessary to dispose lens part 30 on the + side in the Z-direction in order that lens part 30 does not interfere with second board 142. Consequently, it is possible to miniaturize housing 10.

Further, second board 142 includes second extending portion 144B. It is thus possible to separate boosting part 150 from image capturing part 40. Accordingly, it is possible to reduce the influence of the magnetic field of inductors 150A and 150B on the image capturing device of image capturing part 40.

Figure 28:
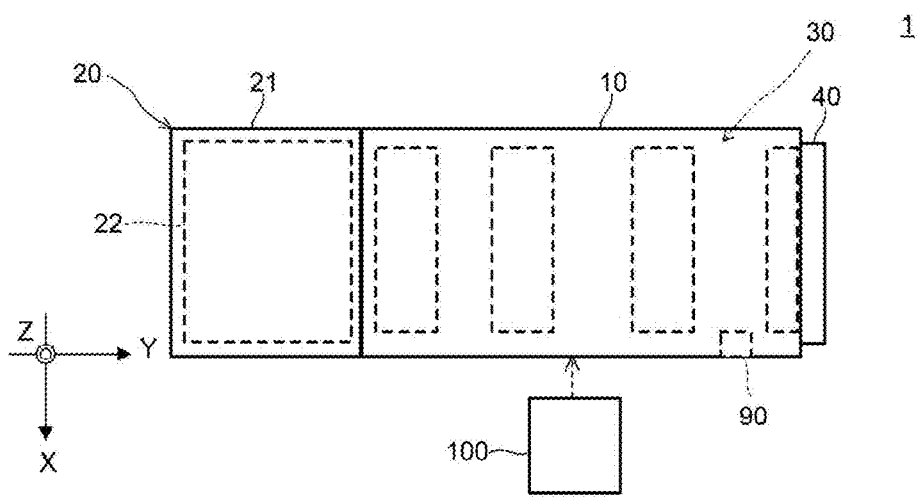
FIG. 28 schematically illustrates a camera module according to a modification.

Note that the above-described embodiment has been described without reference to variations of two inductors 150A and 150B. However, as illustrated in FIG. 28, storage 90 for storing variation data of the inductors may be disposed, for example.

Storage 90 is a non-volatile memory etc., for example, and is disposed at any position in housing 10, such as in a vacant space on the second wall or the fourth wall, for example.

Drive control part 100 drives lens driving part 60 based on the variation data stored in storage 90.

Accordingly, it is possible to conduct a drive control in consideration of the variation of two inductors 150A and 150B.

Figure 29:
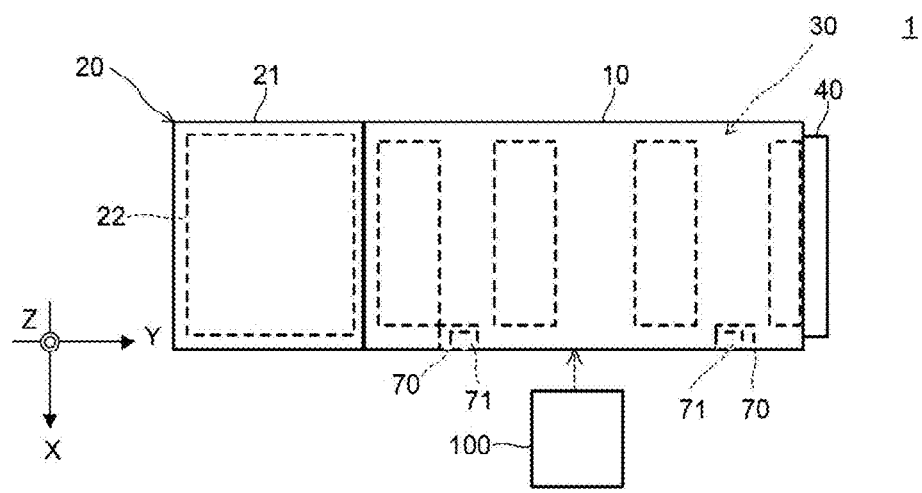
FIG. 29 schematically illustrates a camera module according to another modification.

In addition, as illustrated in FIG. 29, the storage may be storage 71 built in position detecting part 70 in a case where a digital Hall element in which a storage is built in position detecting part 70 is used.

Figure 30:
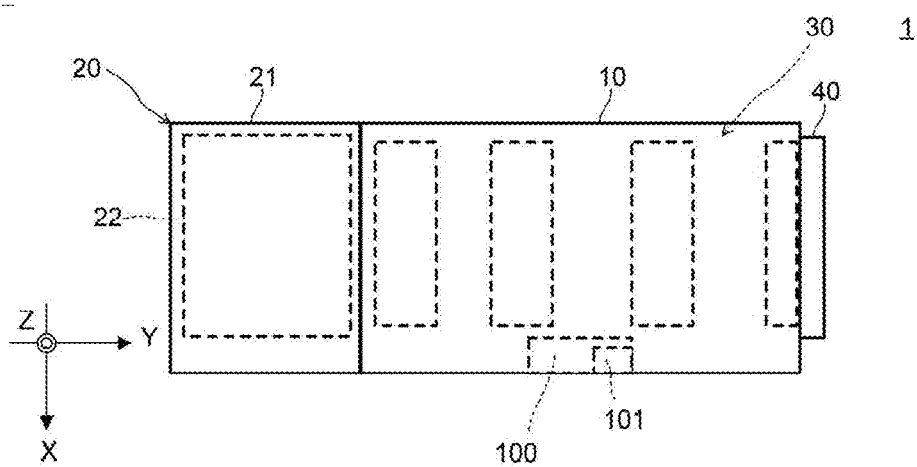
FIG. 30 schematically illustrates a camera module according to still another modification.

Further, the above-described embodiment has been described in which drive control part 100 is disposed outside of housing 10 (optical-element driving device). However, the present invention is not limited to this. The drive control part may, for example, be disposed inside of housing 10 as illustrated in FIG. 30. In addition, in this case, storage 101 in drive control part 100 may be configured to store the variation data of two inductors 150A and 150B.

Further, boosting part 150 includes two inductors 150A and 150B in the above-described embodiment. However, the present invention is not limited to this. The boosting part may include one or more inductors, or may include an inductor corresponding in number to an ultrasonic motor.

The above-described embodiment has been described in which a device including lens driving part 60, boosting part 150, and the like is used as the optical-element driving device. However, the present invention is not limited to this. A device including, for example, reflection driving part 20 illustrated in FIG. 2 is used as the optical-element driving device.

In this case, the optical element (movable part) is mirror 22, and an ultrasonic motor and a boosting part are disposed in reflecting housing 21. The mirror rotates by the drive of the ultrasonic motor. In addition, the boosting part boosts the input voltage, and supplies it to the ultrasonic motor.

Even with this configuration, it is possible to improve user-friendliness in the same manner as the device including the lens driving part, etc.

Further, the reflection driving part is provided with the mirror in the above-described embodiment. However, the present invention is not limited to this, and may, for example, be provided with a prism.

In addition, in the above embodiment, boosting part 150 includes cover portion 151. However, the present invention is not limited thereto, and does not have to include the cover portion.

Further, in the above-described embodiment, second board 142 includes second extending portion 144B. However, the present invention is not limited to this, and the second board does not have to include the second extending portion.

Further, in the above-described embodiment, first extending portion 144A is disposed at the position corresponding to the moving range of third lens unit 33. However, the present invention is not limited to this, and may be disposed at any position as long as first extending portion 144A does not interfere with the lens unit.

Further, in the above-described embodiment, grounding portion 144C is electrically conductively connected with bottom wall portion 12 by joining member 144D (solder). However, the present invention is not limited to this. For example, the grounding portion may also be electrically conductively connected with the bottom wall portion by an adhesive or the like formed from an electrically conductive resin.

Further, in the above-described embodiment, the portions of fourth wall 114 corresponding to second board 142 are cut out. However, the present invention is not limited to this. Such portions do not have to be cut out as long as the second board does not interfere the lens unit.

Further, in the above-described embodiment, board part 140 is formed from a flexible board. However, the present invention is not limited to this. The board part may be formed from a board other than a flexible board.

Further, in the above-described embodiment, boosting part 150 is disposed in the region of fourth wall 114 on the side opposite to lens driving parts 60. However, the present invention is not limited to this. The boosting part may also be disposed in the region of the fourth wall on the same side as the lens driving parts.

Further, in the above-described embodiment, first board 141 and second board 142 are formed integrally. However, the present invention is not limited to this. The first board and the second board may be formed separately.

Further, in the above-described embodiment, one position detecting part 70 is disposed on each frame 61, but the present invention is not limited thereto. For example, as illustrated in FIG. 27, a configuration may be employed which includes a plurality of position detecting parts 70 disposed side by side in the direction of the optical axis (Y direction).

Further, in the above embodiment, a configuration having two guide shafts is employed, but the present invention is not limited thereto. The present invention may have a configuration having, for example, three or more guide shafts. The present invention may also have a configuration having a single guide shaft.

In the above embodiment, support shafts 50 are disposed on both sides in the X direction, but the present invention is not limited to this, and support shaft 50 may be disposed on only one side in the X direction.

In the above embodiment, side wall portion 11 and bottom wall portion 12 of housing 10 are formed by insert molding. However, the present invention is not limited to this, and the bottom wall portion may be adhesively fixed to side wall portion 11.

Further, the above embodiment employs the configuration having two movable lenses composed of second lens unit 32 and third lens unit 33, but the present invention is not limited to this, and the configuration may have a single movable lens, or three or more movable lenses.

Further, the above embodiment employs the configuration having four lens units, but the present invention is not limited to this, and any number of lens units may be provided as long as the configuration has at least one movable lenses. In addition, in the case of a configuration including one movable lens, the number of lens driving parts is also one.

In the above embodiment, interposition part 63 is formed by bending a plate-like metal member, but the present invention is not limited to this, and the main body portion and the contact portion forming the interposition part may be formed by separate members.

In the above embodiment, frame 61 and interposition part 63 are formed of separate members, but the present invention is not limited thereto. For example, frame 61 and interposition part 63 may be integrally formed. That is, the lens driving part may include a moving portion that moves in the direction of the optical axis in accordance with resonance of the resonant portion and is connected to each of the lens units so as to transmit the movement in the direction of the optical axis.

In the above embodiment, each of connecting parts 62 connecting together frame 61 and the lens unit includes the spring member, but the present invention is not limited to this, and any member may be included as long as it is a member having elasticity.

Further, in the above embodiment, third portion 611C of frame 61 is disposed to be spaced apart from second guide shaft 82, but the present invention is not limited to this, and a configuration may also be used in which the third portion may also support the second guide shaft.

The above embodiment has the configuration in which the bottom wall portion includes the bent portions or half punches, but the present invention is not limited to this, and a configuration may also be used in which the bottom wall portion does not includes any bent portion or half punch.

In the above embodiment, resonant portion 641 includes two oscillators 641B, but the present invention is not limited to this, and the present invention may have a configuration in which the resonant portion includes one oscillator, for example.

In the above embodiment, the drive control part, the reflection drive control part, and the image capturing control part are disposed separately, but the present invention is not limited to this, and at least two of the drive control part, the reflection drive control part, and the image capturing control part may be composed of one control part.

Further, although bearing portion 114A is provided in the above embodiment, the present invention is not limited to this, and the present invention does not have to be provided with any bearing portion.

In addition, in the above embodiment, absorbing part 613 is provided, but the present invention is not limited thereto, and no absorbing part may be provided.

For example, while a smartphone serving as a camera-equipped mobile terminal has been described in the above embodiment as an example of the camera-mounted device including camera module 1, the present invention is applicable to a camera-mounted device including a camera module and an image processing part that processes image information obtained by the camera module. The camera-mounted device encompasses an information apparatus and a transporting apparatus. Examples of the information apparatus include a camera-mounted mobile phone, a note-type personal computer, a tablet terminal, a mobile game machine, a web camera, drone, and a camera-mounted in-vehicle device (for example, a rear-view monitor device or a drive recorder device). In addition, examples of the transporting apparatus include an automobile, drone, and/or the like.

Figure 32A:
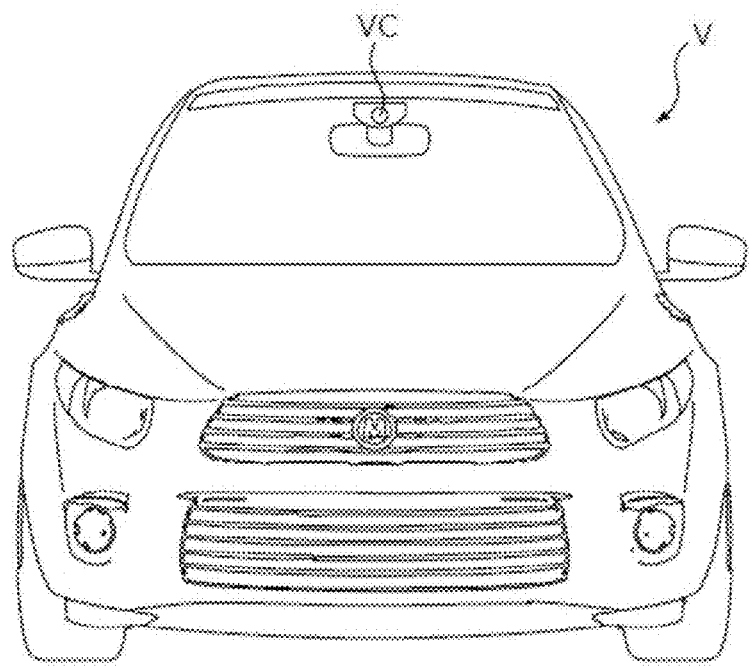
FIG. 32A illustrates an automobile in which the camera module is mounted.
Figure 32B:
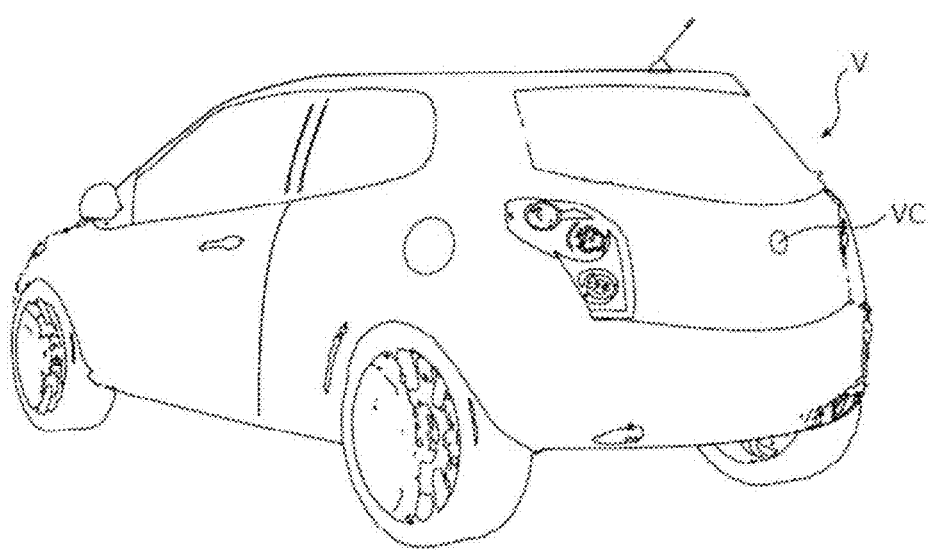
FIG. 32B illustrates the automobile in which the camera module is mounted.

FIGS. 32A and 32B illustrate automobile V serving as the camera-mounted device in which in-vehicle camera module VC (Vehicle Camera) is mounted. FIG. 32A is a front view of automobile V and FIG. 32B is a rear perspective view of automobile V. In automobile V, camera module 1 described in the embodiment is mounted as in-vehicle camera module VC. As illustrated in FIGS. 32A and 32B, in-vehicle camera module VC may, for example, be attached to the windshield so as to face forward, or to the rear gate so as to face backward. In-vehicle camera module VC is used for rear monitoring, drive recording, collision avoidance control, automatic drive control, and the like.

In addition, the above-described embodiments merely describe examples of implementations for practicing the present invention, and should not be construed as limiting the technical scope of the present invention. That is, the present invention can be embodied in various forms without departing from the spirit, scope, or principal features of the present invention. For example, the shape, size, number, and material of each part described in the above embodiment are merely examples, and can be changed as appropriate.

The disclosure of U.S. provisional Patent Application No. 63/011,322, filed on Apr. 17, 2020, including the specification, drawings and abstract is incorporated herein by reference in its entirety.

INDUSTRIAL APPLICABILITY

The optical-element driving device according to the present invention is useful as an optical-element driving device, a camera module, and a camera-mounted device capable of improving user-friendliness.

REFERENCE SIGNS LIST

1 Camera module
10 Housing
11 Side wall portion
12 Bottom wall portion
20 Reflection driving part
21 Reflecting housing
22 Mirror
23 Reflection drive control part
30 Lens part
31 First lens unit
32 Second lens unit
32A Main body portion
32B Supported portion
33 Third lens unit
33A Main body portion
33B Supported portion
34 Fourth lens unit
34A Protruding portion
40 Image capturing part
50 Support shaft
60 Lens driving part
61 Frame
62 Connecting part
63 Interposition part
64 Ultrasonic motor
70 Position detecting part
80 Guide part
81 First guide shaft
82 Second guide shaft
100 Drive control part
111 First wall
111A Placement portion
111B Engaged portion
111C Terminal placement portion
112 Second wall
112A Supporting portion
112B Placement portion
112C Guide supporting portion
112D Opening portion
113 Third wall
113A Bridging portion
113B Supporting portion
113C Guide supporting portion
114 Fourth wall
114A Bearing portion
114B Board placement portion
121 Positioning portion
122 Bent portion
123 Half punch
130 Terminal part
131 Outer terminal portion
131A External terminal
132 Inner terminal portion
132A Conduction terminal
132B Driving terminal
140 Board part
141 First board
141A Input/output terminal
141B Detection terminal
142 Second board
143 Boosting placement portion
144 Board connection portion
144A First extending portion
144B Second extending portion
144C Grounding portion
144D Joining member
145 Interconnection portion
145A First input interconnection
145B First output interconnection
145C Second input interconnection
145D Second output interconnection
146 Shield portion
146A First shield
146B Second shield
146C Through hole
150 Boosting part
150A Inductor
150B Inductor
151 Cover portion
200 Image capturing control part
611 Guided portion
611A First portion
611B Second portion
611C Third portion
611D Fourth portion
612 Magnet holding portion
613 Absorbing part
614 Magnet part
614A Magnet
614B Magnet
614C Opposing surface
614D Border
631 First interposition member
631A Engaging hole
631B Engaging hole
632 Second interposition member
632A Main body portion
632B Contact portion
632C Connecting portion

632D Connecting section
641 Resonant portion
641A Body portion
641B Oscillator
641C Protruding portion
641D Energization portion
642 Piezoelectric element
643 First electrode
643A Clamping portion
643B Electrode part
644 Second electrode

The invention claimed is:

1. An optical-element driving device configured to be built in a camera-mounted device, the optical-element driving device comprising:
   a movable part configured to hold an optical element;
   a housing housing the movable part;
   a driving part including an ultrasonic motor and configured to drive the movable part with respect to the housing;
   a boosting part including an inductor that boosts an input voltage to be inputted to the driving part and supplies the input voltage to the ultrasonic motor; and
   a board part fixed to the housing and on which the inductor is disposed, wherein
   the ultrasonic motor includes piezoelectric elements generating vibration by the input voltage and a resonant portion resonating with the vibration of the piezoelectric elements,
   the inductor is covered by a cover portion, and
   the housing is cut out at a location corresponding to the inductor.

2. The optical-element driving device according to claim 1, wherein
   the resonant portion includes a body portion on which the piezoelectric elements are disposed and two oscillators extending from the body portion.

3. The optical-element driving device according to claim 1, wherein
   the board part includes a boosting placement portion on which the inductor is disposed and a first board connected to the boosting placement portion and including a terminal, and
   the cover portion is formed in a box shape corresponding to a region of the boosting placement portion.

4. The optical-element driving device according to claim 1, wherein
   the housing includes a lid member.

5. The optical-element driving device according to claim 1, wherein
   the boosting part includes a first inductor and a second inductor,
   the driving part includes two ultrasonic motors, and
   an interconnection connected to the first inductor and an interconnection connected to the second inductor are separated from each other and are connected to either of the two ultrasonic motors.

* * * * *